United States Patent [19]
Imaizumi et al.

[11] Patent Number: 5,987,176
[45] Date of Patent: Nov. 16, 1999

[54] IMAGE PROCESSING DEVICE

[75] Inventors: Shoji Imaizumi, Shinshiro; Takayuki Nabeshima; Hideyuki Hashimoto, both of Toyokawa; Kazuomi Sakatani, Toyohashi, all of Japan

[73] Assignee: Minolta Co., Ltd., Osaka, Japan

[21] Appl. No.: 08/666,614

[22] Filed: Jun. 18, 1996

[30] Foreign Application Priority Data

Jun. 21, 1995 [JP] Japan ................................ H-7-154556

[51] Int. Cl.⁶ ........................................................ G06K 9/36
[52] U.S. Cl. ........................ 382/232; 382/243; 382/166; 358/522
[58] Field of Search .................................... 382/232, 166, 382/243; 358/433, 518, 515, 522

[56] References Cited

U.S. PATENT DOCUMENTS

| | | | |
|---|---|---|---|
| 4,979,031 | 12/1990 | Tsuboi et al. | 358/75 |
| 5,119,182 | 6/1992 | Tsuboi et al. | 358/75 |
| 5,144,688 | 9/1992 | Bovir et al. | 382/166 |
| 5,361,147 | 11/1994 | Katayama et al. | 358/532 |
| 5,414,527 | 5/1995 | Koshi et al. | 358/433 |

FOREIGN PATENT DOCUMENTS

| | | | | |
|---|---|---|---|---|
| 4-144485A | 5/1992 | Japan | | H04N 1/413 |
| 4-145765A | 5/1992 | Japan | | H04N 1/393 |
| 4-157975A | 5/1992 | Japan | | H04N 1/387 |
| 4-220076A | 8/1992 | Japan | | H04N 1/387 |
| 4-229763 | 8/1992 | Japan | | H04N 1/04 |
| 4-236568A | 8/1992 | Japan | | H04N 1/387 |

*Primary Examiner*—Jose L. Couso
*Assistant Examiner*—Anh Hong Do
*Attorney, Agent, or Firm*—Burns, Doane, Swecker & Mathis, LLP

[57] ABSTRACT

A method and device for processing image data for a document includes the steps of reading RGB image data for the document; dividing the document image data into a plurality of blocks including a prescribed pixel matrix; calculating an average value information and a gradation range index for each of the blocks; converting the data for each pixel of each of the blocks into coded image data based on the average value information and the gradation range index so that the coded image data defines each pixel with fewer gradation levels than the original image data; storing in a memory unit the gradation range index and coded data, which were obtained for each block through the converting step; forming letter distribution histograms for a primary scanning direction and a secondary scanning direction for each block determined to belong to a letter image; identifying a direction in which letters of the document are aligned based on a number of change points in the histogram for the primary scanning direction and a number of change points in the histogram for the secondary scanning direction; decoding the coded data for each of the blocks based on the respective average value information and gradation range index in the memory unit for the block; and forming an image on copy paper based on the decoded data.

20 Claims, 21 Drawing Sheets

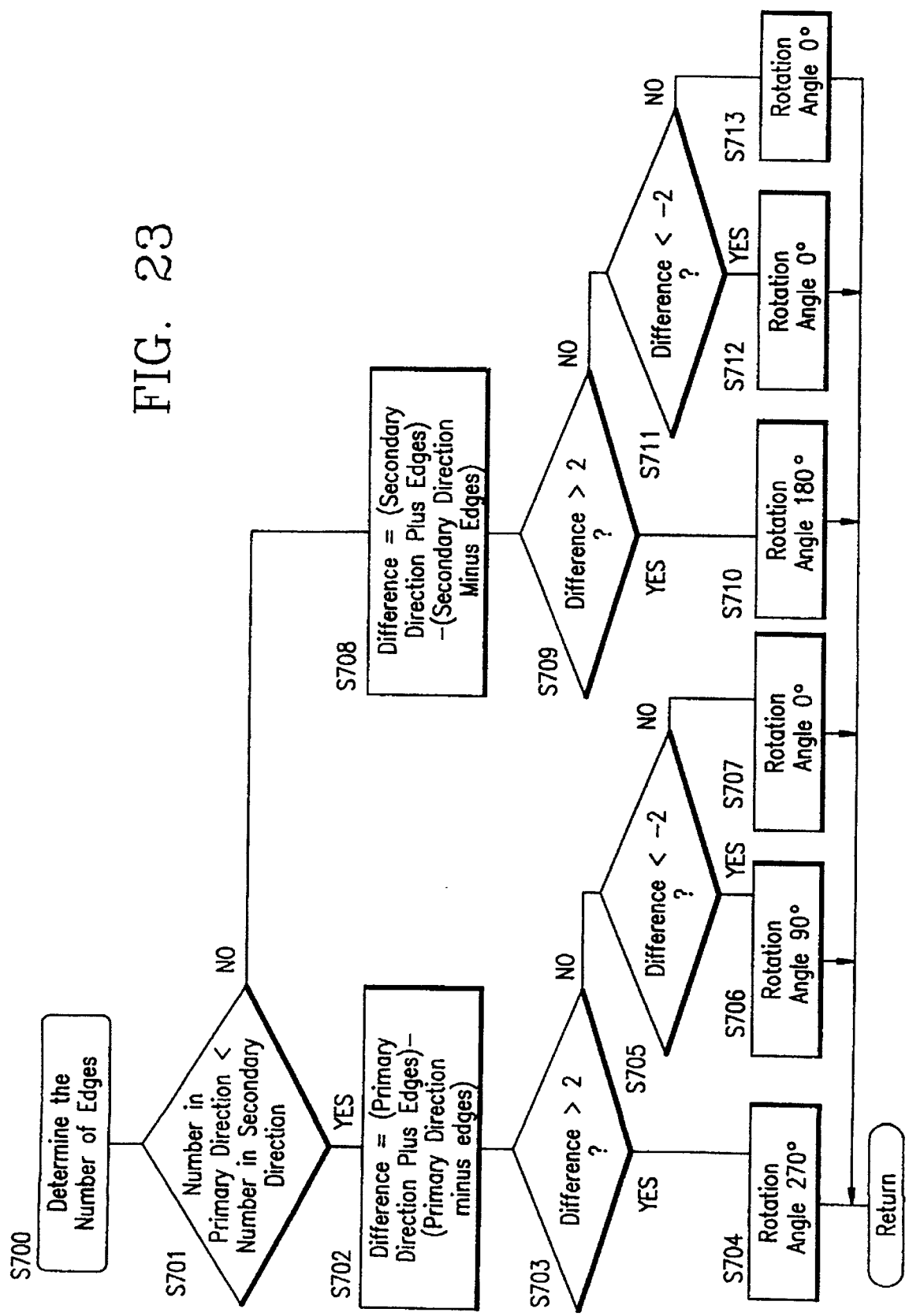

IMAGE PROCESSING DEVICE

BACKGROUND OF THE INVENTION

1. Field of the Invention

The present invention pertains to an image processing device that compresses and codes image information using the GBTC (Generalized Block Truncation Coding) method.

2. Description of the Related Art

The GBTC method has been proposed in recent years as a method to compress and expand document image data. Under the GBTC method, the document image data is divided into blocks, each of which has a prescribed number of pixels, and data compression is carried out for each block. Specifically, the data for each pixel in the block is quantized into fewer gradation levels using average value information LA and gradation range index LD calculated from the image data for the block. In other words, the image data for each pixel is converted into coded data $\Phi ij$ obtained through said quantization and the amount of information consequently becomes compressed. Average value information LA is obtained by dividing into two equal parts the sum of average value Q1 of image data values equal to or lower than parameter P1 and average value Q4 of image data values equal to or larger than parameter P2 (P1<P2), said parameters being determined depending on the image data for the block. Gradation range index LD is the difference between average value Q4 and average value Q1.

FIG. 1 is a drawing to explain the general flow of the coding process using the GBTC method. First, as shown in FIG. 1(a), the document image data is divided into blocks each comprising 4×4 pixels. Image data is then extracted from each block. The extracted image data for each block is coded using the GBTC method. Image data for a pixel has a data amount of one byte (=8 bits=256 gradations). In this GBTC coding process, the data for the 16 pixels of the block (1 [8 bits]×16 bytes=128 bits) is coded (compressed) into one-byte for a gradation range index LD, one-byte for an average value information LA and four-bytes of coded data. The four-bytes of coded data is obtained by classifying and allocating data for each pixel into one of four levels (quantization). In other words, the entire block ends up having four-bytes of coded data because each of the 16 pixels has 2-bits of coded data.

Consequently, the image data for one block (16 bytes) is coded into six-bytes of (48-bits) data. In other words, the amount of image data is compressed to three-eighths of what it was prior to compression.

FIG. 1(c) indicates that the amount of compressed, i.e., coded, image data for one block is equivalent to image data for six pixels prior to compression. The coded data is decoded by calculating, based on gradation range index LD and average value information LA, and image data (1 byte) that corresponds to the coded data (2 bits).

The image data for each of the 16 pixels Xij (i, j=1, 2, 3, 4) in the 4×4 pixel block is converted through the decoding process into one of four levels of data (1 byte) out of the 256 gradations. Here, the decoded data clearly includes an error in comparison with the original image data. However, this error is negligible due to the nature of human vision. In other words, there is little image deterioration as far as regular images are concerned.

Parameters Q1 and Q4 can be obtained from gradation range index LD and average value information LA included in the coded data. In other words, a letter image comprising black areas equal to or smaller than parameter P1 and white areas equal to or larger than parameter P2 can be reproduced from the coded data.

In the JPEG (Joint Photographic Experts Group) method in which data obtained through DCT (discrete cosine transform) conversion of image data is converted into Huffman codes, the rate of data compression varies depending on the type of the document. In other words, with some documents, higher data compression takes place in the JPEG method than in the GBTC method, but with others, there are cases where very little compression is possible using the JPEG method. Therefore, it is difficult to set the capacity of the image processing device's built-in memory using the JPEG method. On the other hand, using the GBTC method, data compression is available at a constant compression rate at all times. Therefore, it is easy to set the capacity of the image processing device's built-in memory using the GBTC method.

In an image processing device in which coding is performed using the JPEG method, DCT conversion of the document image data takes place with a block comprising a certain pixel matrix as one unit. Unlike average value information LA, gradation range index LD and coded data $\Phi ij$ that can be obtained through the GBTC coding process, the DCT-converted data is not data that reflects the average value or gradation range of the data for pixels comprising the block. Therefore, even if the DCT-converted data is processed, the density and color balance of the reproduced image cannot be changed. Therefore, in order to identity the type and orientation of the document and edit and process the image that is to be reproduced on copy paper based on the result of said identification, these processes needed to be performed prior to coding of the image data or after the decoding process.

One of the image identification processes performed by the image processing device is identification of the orientation of the document. In this process to identify the orientation of the document, the orientation of the document is identified and the image is rotated such that the copy output is oriented correctly. For example, in the device disclosed in Japanese Laid-Open Patent Hei 4-229763, the orientation of the letter images is identified, based on which identification of the orientation of the document is performed. However, in this device, the process to identify the letter image is complex and time-consuming. Moreover, a large amount of memory is needed in order to store reference letters. This makes the device an unrealistic system, and poses problems in practical use.

In addition to the device described above, a device that determines the orientation of the image based on the locations of commas and periods has been proposed. Since this device, unlike the device described above that identifies the orientation of a letter image, does not require letter pattern matching, it is relatively more realistic, but because identification of commas and periods is performed using special circuits and software, it takes longer to perform processing. Further, a device that determines the orientation of the image based on the distribution of blank areas of the document has also been proposed. While the method of identification of the orientation based on the distribution of blank areas of the document is very easy, where both a letter image and a photographic image exist in the document image and where columnization and tabs are used in the letter image, the shapes of the blank areas are complex, and as a result the device is unable to perform accurate identification of the orientation of the image.

In a digital full-color copy machine, etc. in which coding via the JPEG method takes place, a memory with a large capacity is needed for the orientation identification process in order to store the image data prior to coding or after decoding. In addition, since the orientation identification process is carried out with regard to the image data saved in the large memory described above, there is a practical problem that a long calculation time is required.

OBJECTS AND SUMMARY

An object of the present invention is to resolve the problems described above.

Another object of the present invention is to provide an image processing device that can effectively identify the orientation of the document image by carrying out a coding process using the GBTC method.

Yet another object of the present invention is to provide an image processing device that can identify the orientation of the document image without requiring a long calculation time.

Yet another object of the present invention is to provide an image processing device that can identify the orientation of the document image using a small amount of memory.

Yet another object of the present invention is to provide an image processing device that is capable of correcting the orientation of the image to be reproduced in accordance with the identified orientation of the document image, as well as of easily identifying the orientation of the document image.

Yet another object of the present invention is to provide an image processing device that can accurately identify the orientation of the document image.

Yet another object of the present invention is to provide an image processing device that can identify the orientation of the document image using a simple construction.

These and other objects are attained by means of an image processing device that comprises a calculating unit that divides the document image data into blocks each comprising a prescribed pixel matrix and that calculates average value information and a gradation range index based on the image data contained in each block, a coding unit that converts the data for each pixel of the block into gradation levels fewer than in the original image data based on said average value information and gradation range index, and an identifying means that identifies the orientation of the document image based on the coded image data.

These and other objects are also attained by means of an image processing device that comprises a histogram forming means that forms letter distribution histograms for the primary scanning direction and the secondary scanning direction, a direction identifying unit that identifies the direction in which the letters of the document are aligned based on the number of change points in the histogram for the primary scanning direction and the number of change points in the histogram for the secondary scanning direction, said histograms being formed by said histogram forming means, and an orientation identifying unit that identifies the locations of the line starts based on the number of change points at which the histogram value increases and the number of change points at which the histogram value decreases, said change points being obtained from the histogram for the scanning direction parallel to the identified orientation.

These and other objects are also attained by means of an image processing device that comprises a reading means that reads the RGB image data for the document, a data converting unit that converts the RGB image data read by the reading means into lightness component data and chromaticity component data, a coding unit that divides the document image data into blocks each comprising a prescribed pixel matrix and obtains average value information and a gradation range index from the image data for each block and that quantizes the data for pixels of the block to gradation levels fewer than in the original image data based on said average value information and gradation range index, a memory unit that stores the lightness component and chromaticity component average value information, gradation range index and coded data, which were obtained for each block through the coding process, an attribute determining means that determines whether or not a block belongs to a letter image based on the value of the lightness component gradation range index obtained for each block through the coding process, a histogram forming means that forms letter distribution histograms for the primary scanning direction and the secondary scanning direction regarding blocks determined to belong to a letter image by said attribute determining means, an orientation identifying unit that identifies the direction in which the letters of the document are aligned based on the number of change points in the histogram for the primary scanning direction and the number of change points in the histogram for the secondary scanning direction, said histograms being formed by said histogram forming means, and that identifies the line starts based on the number of change points at which the histogram value increases and the number of change points at which the histogram value decreases in the histogram for the scanning direction parallel to the identified direction in which the letters of the document are aligned, a decoding unit that decodes the coded data for a block based on the average value information and gradation range index of the block read from said memory unit, an image forming means that forms an image on the copy paper based on the decoded data, and an image rotating unit that changes the order of the read addresses for the blocks to be read to said decoding unit from said memory unit and the order of the coded data for each block to be read based on the result of processing by said orientation identifying unit.

BRIEF DESCRIPTION OF THE DRAWINGS

These and other objects and features of the present invention will become apparent from the following description of preferred embodiments thereof taken in conjunction with the accompanying drawings, in which:

FIGS. 6($b$) and 6($c$) are graphs used in the color area optimization process with regard to chromaticity components a* and b*;

FIGS. 7($b$) and 7($c$) are graphs used in the color area reverse optimization process with regard to chromaticity components a* and b*;

FIG. 23 is a flow chart showing the sequence to determine the number of edges.

In the following description, like parts are designated by like reference numbers throughout the several drawings.

DETAILED DESCRIPTION OF THE PREFERRED EMBODIMENT

A digital full-color copy machine, which is an exemplary embodiment of the image processing device of the present invention, is explained below in the order shown below with reference to the attached drawings.

(1) Coding and Decoding Using the GBTC Method
(2) Digital Full-Color Copy Machine
(3) Orientation Identification Process
   (3-1) Orientation Identification Process (3-1-1) Letter Image Characteristics (3-1-2) Outline of the Orientation Identification Process (3-1-3) Image Rotation Process (3-2) Main Routine
   (3-3) Orientation Identification Routine
   (3-4) Primary Scanning Direction Histogram Calculation Routine
   (3-5) Primary Scanning Direction Edge Counting Routine
   (3-6) Secondary Scanning Direction Histogram Calculation Routine
   (3-7) Secondary Scanning Direction Histogram Edge Counting Routine
   (3-8) Number of Edges Determination Routine (1) Coding and Decoding Using the GBTC Method In the GBTC method, document image data is divided into blocks, each of which has a prescribed number of pixels, and data compression is carried out for each block. Specifically, the data for each pixel in the block is quantized into fewer gradation levels using average value information LA and gradation range index LD calculated from the image data for the block. In other words, the image data for each pixel is converted into coded data $\Phi ij$ obtained through said quantization and the information consequently becomes compressed. Average value information LA is obtained by dividing into two equal parts the sum of average value Q1 of image data values equal to or lower than parameter P1 and average value Q4 of image data values equal to or larger than parameter P2 (P1<P2), said parameters being determined depending on the image data for the block. Gradation range index LD is the difference between average value Q4 and average value Q1.

Figure 1:
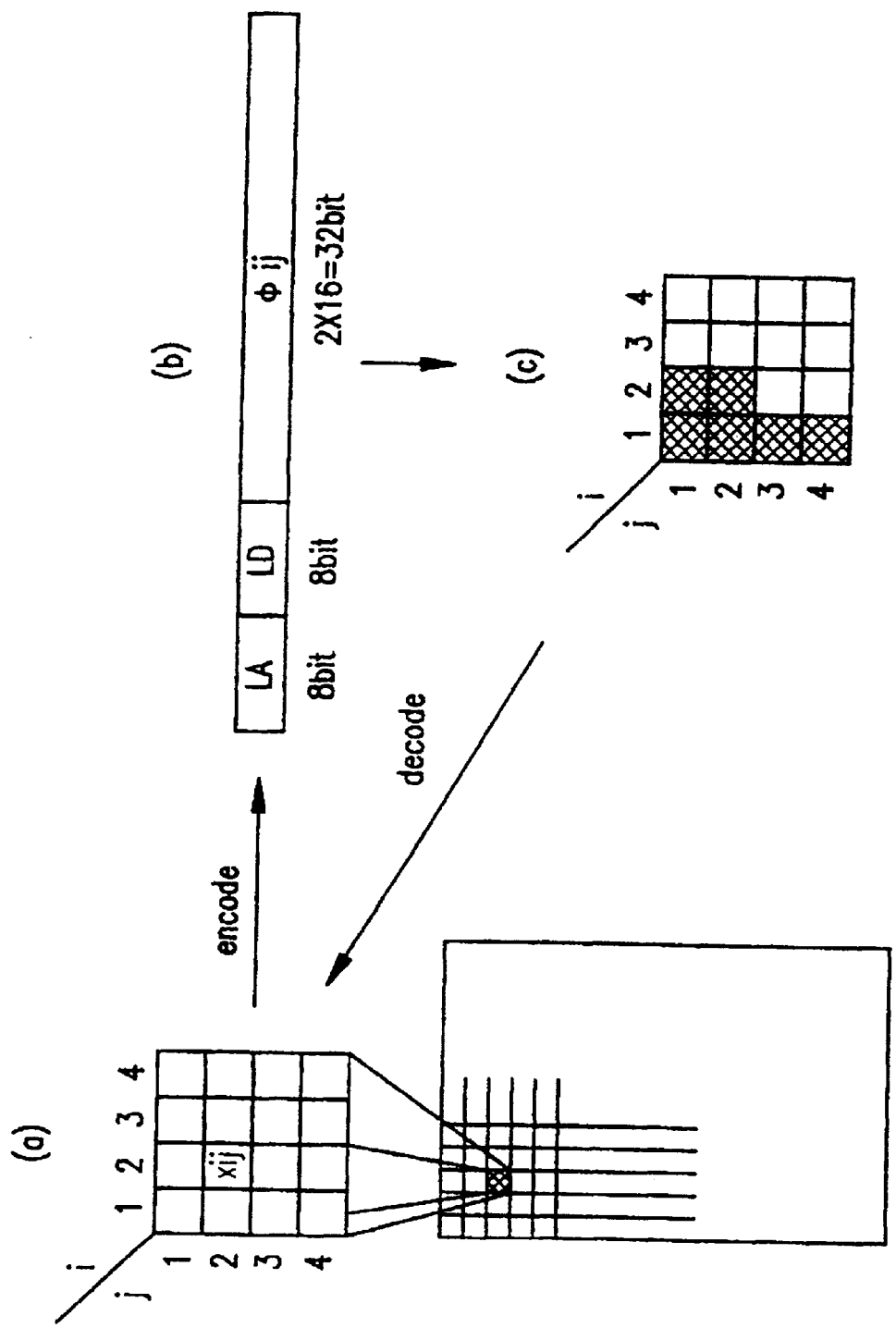
FIG. 1 shows the flow of the coding process using the GBTC method.

FIG. 1 is a drawing to explain the general flow of the coding process using the GBTC method. First, as shown in FIG. 1(*a*), the document image data is divided into blocks each comprising 4×4 pixels. Image data is then extracted from each block. The extracted image data for each block is coded using the GBTC method. Image data for a pixel has a data amount of one byte (=8 bits=256 gradations). In this GBTC coding process, the data for the 16 pixels of the block (1 [8 bits]×16 bytes=128 bits) is coded (compressed) into a one-byte gradation range index LD, a one-byte average value information LA and four-bytes of coded data. The four-bytes coded data are obtained by classifying and allocating data for each pixel into one of four levels (quantization). In other words, the entire block ends up having four-bytes of coded data because each of the 16 pixels has 2-bits of coded data.

Consequently, the image data for one block (16 bytes) is coded into six-bytes (48-bit) of data. In other words, the amount of image data is compressed to three-eighths of what it was prior to compression.

FIG. 1(*c*) indicates that the amount of coded image data is equivalent to image data for six pixels prior to coding. The coded data is decoded by calculating, based on gradation range index LD and average value information LA, image data (1 byte) that corresponds to the coded data (2 bits).

In this embodiment, the document image data is extracted for each block comprising 4×4 pixels. However, the size of the block is not limited to this; the extraction may take place on any size block, such as a 3×3 pixel block or a 6×6 pixel block. The coding is also not limited to the conversion of the 256-gradation data for the pixels in the block into four-gradation coded data. The data may be converted into any levels, such as two-gradation or eight-gradation coded data. As explained below, the image processing device of the present invention is characterized in that it determines the image attribute and carries out various types of image processing based on the result of said determination using average value information LA and gradation range index LD obtained from parameters P1 and P2 that are determined based on the image data for the block.

Figure 2:
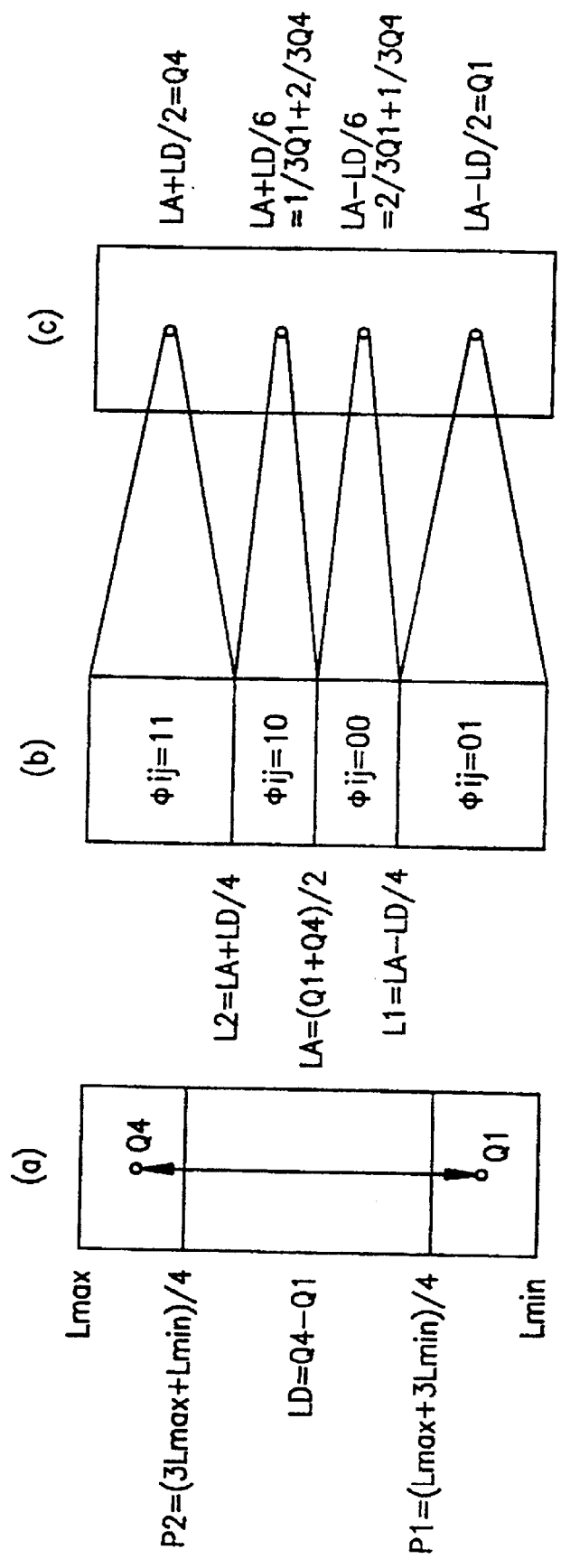
FIG. 2 shows the coding process and decoding process using the GBTC method.

FIGS. 2(*a*) through 2(*c*) show the coding and decoding processes using the GBTC method. FIG. 2(*a*) shows the relationships among the block's largest image data value Lmax, smallest image data value Lmin, parameters P1 and P2, and gradation range index LD. Prescribed characteristic values necessary for the coding is obtained from the image data extracted on a 4×4 pixel block basis. The characteristic values are obtained through the following calculation. First, largest value Lmax and smallest value Lmin among the image data values (8 bits) of the block are detected. The parameter P1, which is a sum of smallest value Lmin and a quarter of the difference between largest value Lmax and smallest value Lmin, and parameter P2, which is a sum of smallest value Lmin and three quarters of said difference, are obtained. Parameters P1 and P2 are obtained using the following equations (1) and (2).

$$P1 = (L\max + 3L\min)/4 \quad (1)$$

$$P2 = (3L\max + L\min)/4 \quad (2)$$

Average value Q1 of the pixel image data values equal to or smaller than parameter P1 is then obtained from the image data for the block. Average value Q4 of the pixel image data values equal to or larger than parameter P2 is obtained from the image data for the block. Based on average values Q1 and Q4 thus obtained, average value information LA (=(Q1+Q4)/2) and gradation range index LD (=Q4−Q1) are obtained. Equations (3) and (4) are then calculated to obtain reference values L1 and L2.

$$L1 = LA - LD/4 \quad (3)$$

$$L2 = LA + LD/4 \quad (4)$$

Reference values L1 and L2 are used together with average value information LA when the one-byte (8-bit) image data for a pixel, or in other words, the 256-gradation image data, is converted into 2-bit data, or in other words, four-gradation coded data.

A code is then allocated to the image data for each pixel. FIG. 2(b) shows the value of coded data $\Phi ij$ that is allocated in accordance with the image data for pixel Xij that is located in the ith line (i=1, 2, 3 or 4) and the jth column (j=1, 2, 3 or 4) of the block. To explain it in more detail, 2-bit coded data $\Phi ij$ is allocated in accordance with the value of the data for pixel Xij in the following manner.

If $Xij \leq L1$, $\Phi ij = 01$

If $L1 < Xij \leq LA$, $\Phi ij = 00$

If $LA < Xij \leq L2$, $\Phi ij = 10$

If $L2 < Xij$, $\Phi ij = 11$

The data coded using the GBTC method comprises coded data for 16 pixels (16×2 bits) and a gradation range index LD and an average value information LA, each of which consists of 1 byte (8 bits).

As shown in FIG. 2(c), when the coded data is decoded, gradation range index LD and average value information LA are used. In other words, the data for pixel Xij is replaced with 256-gradation data as shown below according to the value of coded data $\Phi ij$ allocated to pixel Xij.

When $\Phi ij = 01$, $Xij = LA - LD/2 = Q1$

When $\Phi ij = 00$, $Xij = LA - LD/6 = 2/3Q1 + 1/3Q4$

When $\Phi ij = 10$, $Xij = LA + LD/6 = 1/3Q1 + 2/3Q4$

When $\Phi ij = 11$, $Xij = LA + LD/2 = Q4$

In other words, the image data for each of the 16 pixels Xij in the 4×4 pixel block is converted through the coding process into one of four types of data (1 byte) out of the 256 gradations. Here, the coded data clearly includes an error in comparison with the original image data. However, this error is negligible due to the nature of the human vision. In other words, there is little image deterioration as far as regular images are concerned.

Parameters Q1 and Q4 can be obtained from gradation range index LD and average value information LA included in the coded data. In other words, a letter image comprising black areas equal to or smaller than parameter P1 and white areas equal to or larger than parameter P2 can be reproduced from the coded data.

In the JPEG (Joint Photographic Experts Group) method in which data obtained through DCT conversion of image data is converted into Huffman codes, the rate of data compression varies depending on the type of the document. In other words, with some documents, higher data compression takes place in the JPEG method than in the GBTC method, but with others, there are cases where very little compression is possible using the JPEG method. Therefore, it is difficult to set the capacity of the image processing device's built-in memory using the JPEG method. On the other hand, using the GBTC method, data compression is available at a constant compression rate at all times. Therefore, it is easy to set the capacity of the image processing device's built-in memory using the GBTC method.

(2) Digital Full-Color Copy Machine

Figure 3:
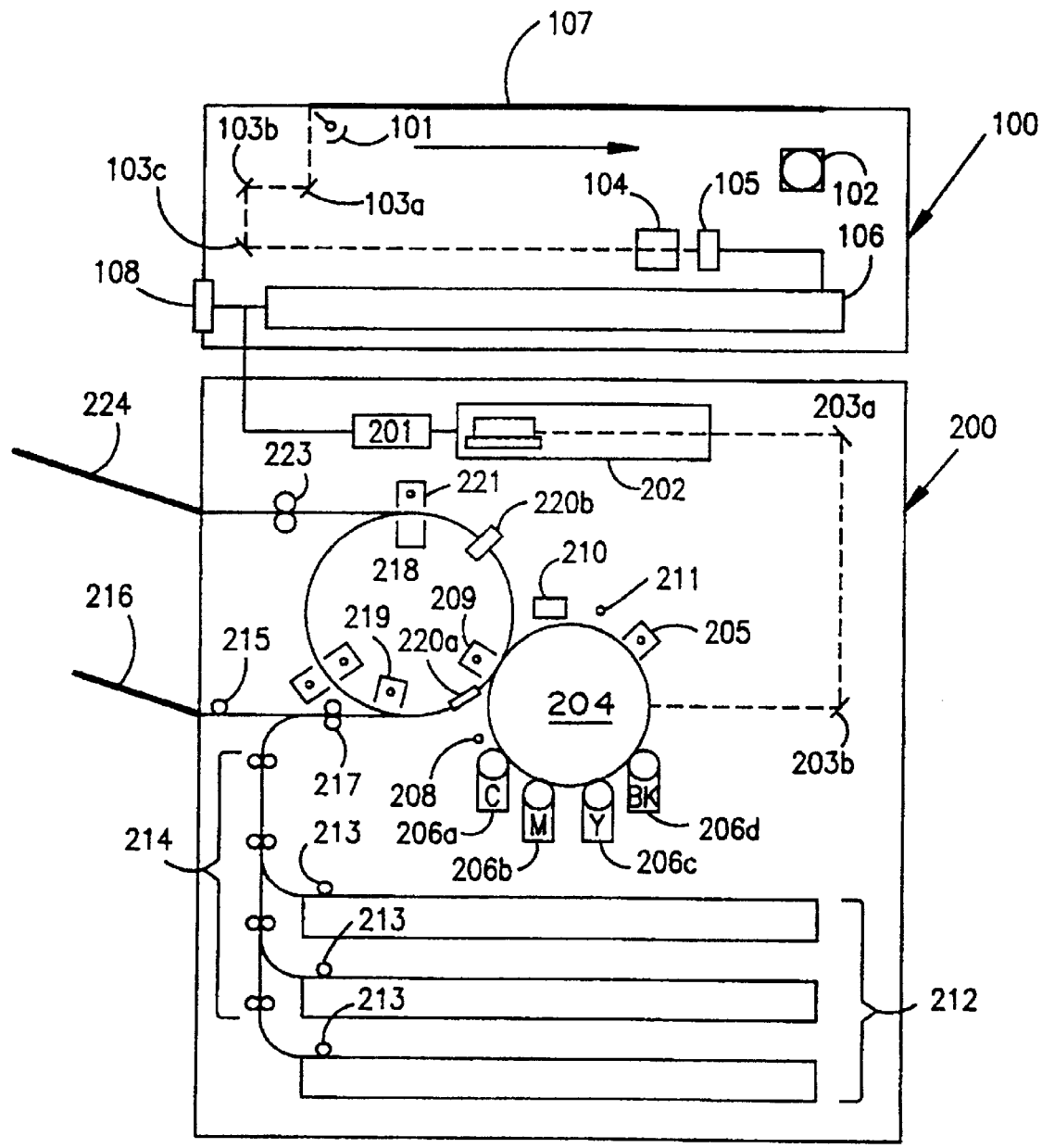
FIG. 3 is a cross-sectional view of a digital color copy machine.

FIG. 3 is a cross-sectional view showing the construction of a digital full-color copy machine. The digital full-color copy machine can be roughly divided into image reading unit 100 that reads the RGB image data for the document and copying unit 200.

In image reading unit 100, the document placed on platen glass 107 is irradiated by exposure lamp 101. The light reflected from the document is led to lens 104 by three mirrors 103a, 103b and 103c, and forms an image on CCD sensor 105. Exposure lamp 101 and mirror 103a move in the direction indicated by an arrow (the secondary scanning direction) by means of scanner motor 102 at speed V corresponding to the set magnification. In this way, the document placed on the platen glass is scanned completely. Mirrors 103b and 103c similarly move in the direction indicated by the arrow (the secondary scanning direction) at V/2 as exposure lamp 101 and mirror 103a move in the direction indicated by the arrow. Multi-value electric signals that are obtained by CCD sensor 105 and consist of three colors R, G and B are converted by read signal processing unit 106 into 8-bit gradation data. Subsequently, the converted image data is output to copying unit 200 via external output port 108.

In copying unit 200, image data correcting unit 201 operates in accordance with the input gradation data gradation correction (γ correction) corresponding to the gradation characteristics of the photoreceptor. Printer exposure unit 202 carries out D/A conversion of the post-correction image data and generates a laser diode drive signal. A semiconductor laser is caused by this drive signal to emit light.

Laser beams generated from printer exposure unit 202 in response to the gradation data expose via reflection mirrors 203a and 203b photoreceptor drum 204 that is driven to rotate. Photoreceptor drum 204 is irradiated during each copying session by eraser lamp 211 and is universally charged by charger 205 before being exposed. When it is exposed in this condition, an electrostatic latent image of the document is formed on photoreceptor drum 204. Only one of cyan (C), magenta (M), yellow (Y) and black (BK) toner containers 206a through 206d is selected, and the electrostatic latent image on photoreceptor drum 204 is developed. The developed toner image is transferred to copy paper rolled on transfer drum 218 by means of transfer charger 209 after being rid of excess charge by pre-transfer eraser 208.

Transfer drum 218 has transfer film on its surface and rotates counterclockwise at the same speed as the rotation speed of the photoreceptor drum. In order to synchronize the position at which the copy paper is held and the image transfer position, reference plate 220a is placed inside transfer drum 218. Reference position sensor 220b generates a prescribed reference signal each time reference plate 220a passes through said sensor as transfer drum 218 rotates. Copy paper is fed into the paper feed path from paper feed cassette unit 212 by paper feed roller 213 and is transported to timing rollers 217 by transport rollers 214. Where the copy paper is inserted from manual tray 216, it is transported to timing rollers 217 by transport rollers 215. Timing rollers 217 supply the copy paper to transfer drum 218 in synchronization with said reference signal and hold the copy paper at a prescribed position on transfer drum 218. The copy paper supplied onto transfer drum 218 by timing rollers 217 is electrostatically held onto transfer drum 218 by holding charger 219.

The printing process above is repeated for the four colors, yellow, magenta, cyan and black. During this time, exposure lamp 101 and mirrors 103a, 103b and 103c repeat the prescribed operations in synchronization with the operations of photoreceptor drum 204 and transfer drum 218.

After the printing process, the copy paper is separated by means of separation dischargers 221 from transfer drum 218 by being rid of the charge which was electrostatically holding the copy paper onto said transfer drum. The copy paper separated from transfer drum 218 goes through a fusing process by means of fusing rollers 223, and then is ejected onto copy paper exit tray 224.

Figure 4:
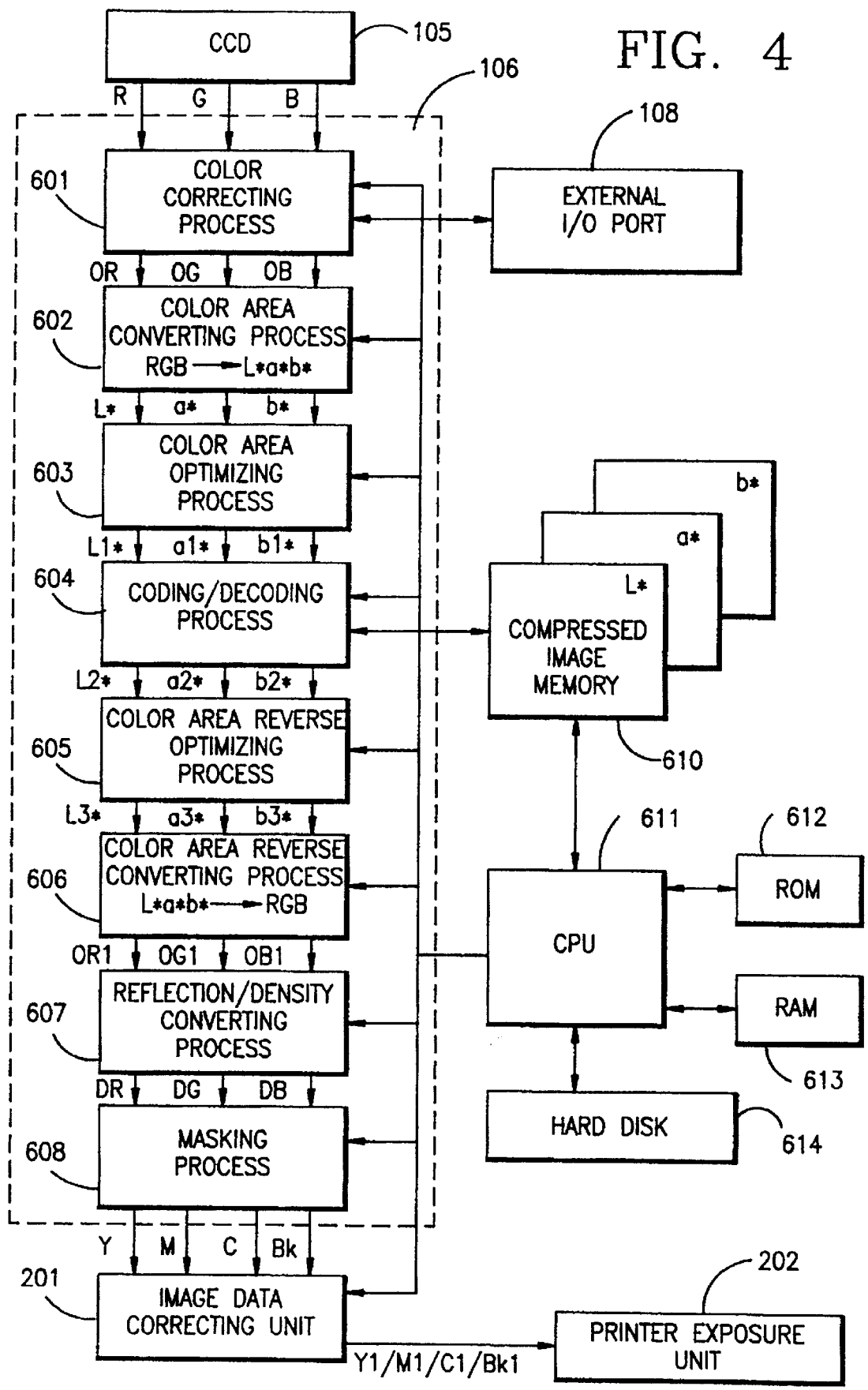
FIG. 4 is a block diagram showing the signal processing routine carried out by the read signal processing unit.

FIG. 4 is a block diagram showing the signal processing sequences carried out by read signal processing unit 106. RGB image data for the document read by CCD sensor 105 has variations due to the differences among individual CCD sensors 105 mounted on the copy machines. Therefore, even when a reference patch of the same chart is used, the read data values may be different. Reading device color correcting unit 601 corrects the read RGB image data into standard RGB image data standardized by the NTSC standard and high vision standard. OR, OG and OB image data obtained via the correction performed by reading device color correcting unit 601 is output to the next color area converting unit 602 as well as to external input/output port 108.

Peripheral equipment connected to this copy machine may receive the OR, OG and OB image data for the document via external input/output port 108.

In addition, using the copy machine of this embodiment, it is possible to form an image using the OR, OG and OB image data input from peripheral equipment via external input/output port 108. In this case, the copy machine functions as a printer. This is because the copy machine is set such that the processing units following and including reading device color correcting unit 601 use standardized RGB image data.

Figure 5:
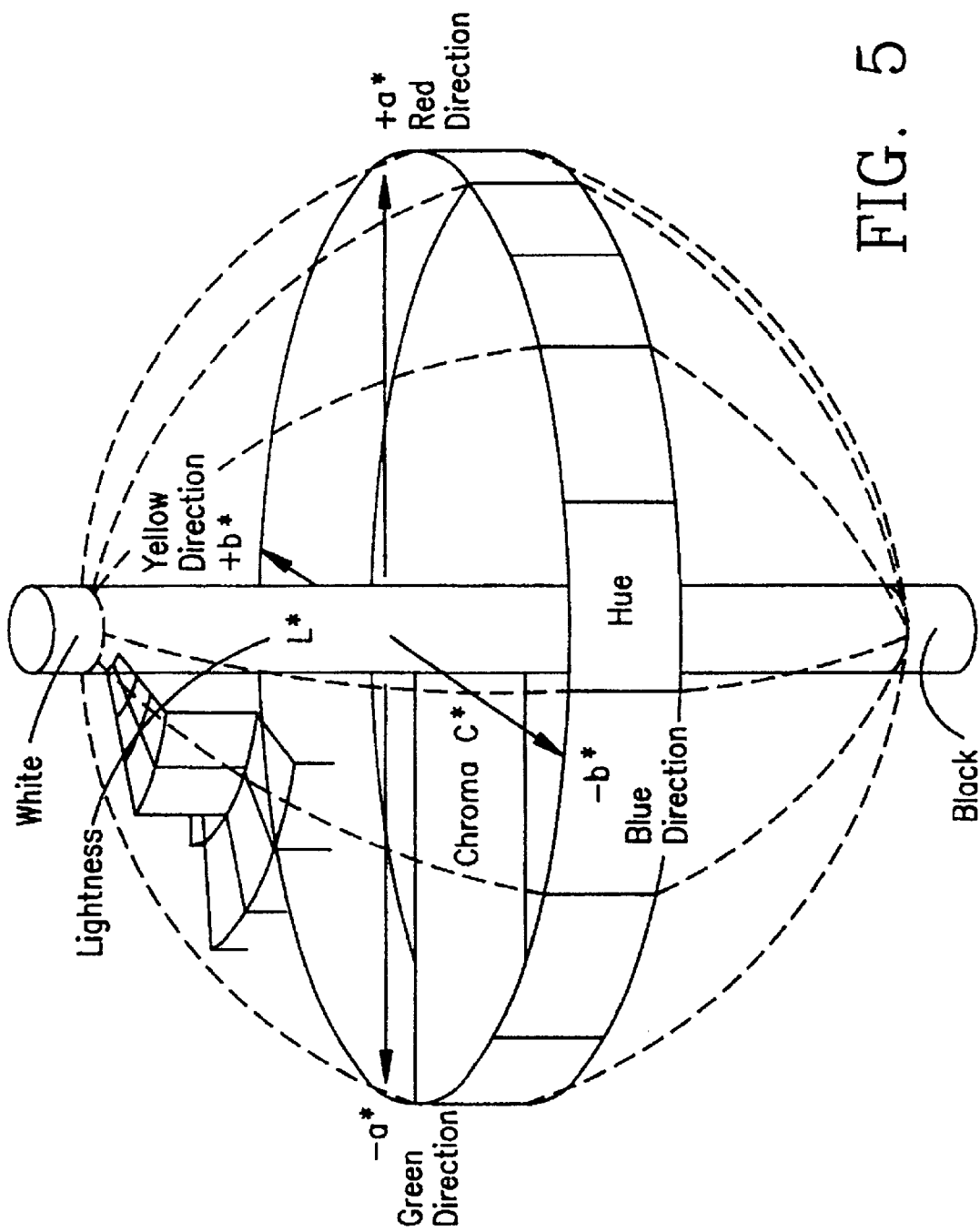
FIG. 5 shows the three-dimensional L*a*b* color system.

Color area converting unit 602 converts the standardized RGB image data (OR, OG, OB) into XYZ color system data and then into L*a*b* color system data. FIG. 5 shows the three-dimensional L*a*b* color system. Lightness 0 (black) through 255 (white) is represented by L* while hue and chromaticness are represented by a* and b*, respectively. Chromaticity components a* and b* represent the directions of color: Chromaticity component a* represents the red-green direction and chromaticity component b* represents the yellow-blue direction.

RGB image data is converted into L*a*b* color system data for the following reasons. As described above, in the GBTC method, 8-bit image data Xij in a 4×4 pixel block is converted into 2-bit coded data Φij. During decoding, one of four types of data representing the 256 gradations that is specified based on gradation range index LD and average value information LA replaces coded data Φij allocated to the pixel. In this way, the image data obtained through decoding has a certain error in comparison with the pre-coding image data. If the colors of pixels are reproduced using the RGB image data including such errors, a discrepancy occurs in the color at the edges of the document. However, if L*a*b* color system data is used, even if there is an error in the data value decoded, only the lightness and chromaticity change slightly and no discrepancy occurs in the color at the edges of the document. Therefore, in this copy machine, when the image data for the document is coded and decoded, the RGB image data is converted once into L*a*b* color system data. Since L*a*b* color system data is used in this copy machine for the reason described above, as long as the RGB image data is converted into hue, lightness and chromaticness data, the conversion may be into data using other color systems such as the L*u*v* color system, YCrCb or HVC.

Color area optimizing unit 603 reduces the deterioration of the image data during decoding. To that end, it performs calculation regarding data for each pixel based on the graphs shown in FIGS. 6(a) through 6(c) before the image data for the document represented using the L*a*b* color system (L*, a*, b*) is coded. In other words, it changes the distribution of lightness component L* such that the distribution may be within a 0–255 range for each document. It then changes the distributions of chromaticity components a* and b* such that they may be within a range of –127 to 128 for each document.

First, largest values L*max, a*max and b*max and smallest values L*min, a*min and b*min are obtained from the document image data (L*, a*, b*). Color area optimizing unit 603 carries out the calculation shown in the following equation (5) with regard to lightness component L* and obtains lightness component L1*.

$$L1^* = 255/(L^*\max - L^*\min) \times (L^* - L^*\min) \quad (5)$$

Figure 6A:
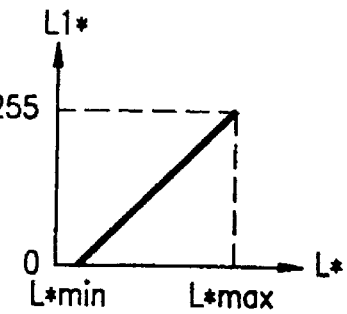
FIG. 6($a$) is a graph used in the color area optimization process with regard to lightness component L*.

This calculation is based on the graph shown in FIG. 6(a). In other words, the calculation of equation (5) converts the values of lightness component L* that are distributed in the L*max–L*min range into values that are distributed within a 0–255 range.

The calculation shown as equation (6) below is also carried out as to chromaticity component a*, and chromaticity component a1* is obtained. In equation (6), where the value of a* is 0, processing takes place such that the value of a1* after the optimization will also be 0. This processing is performed because when the color of the pixel is achromatic where the values of chromaticity components a* and b* are both 0, these values must be maintained at 0.

$$a1^* = 128/a^*\max \times a^* \quad (6)$$

Provided, however, $0 \leq a^* \leq a^*\max$ $$a1^* = 127/|a^*\min| \times (a^* - a^*\min) - 127 \quad (6)$$

Provided, however, $a^*\min \leq a^* \leq 0$

Figure 6B:
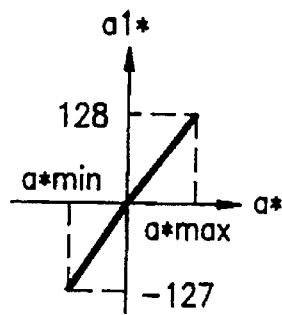

This calculation is based on the graph shown in FIG. 6(b). In other words, the calculation of equation (6) converts the values of chromaticity component a* that are distributed in a 0–a*max range into values that are distributed in a 0–128 range and the values of chromaticity component a* that are distributed in an a*min–0 range into values that are distributed in a –127–0 range.

The calculation shown as equation (7) below is then carried out as to chromaticity component b*, and chromaticity component b1* is obtained. In equation (7), where the value of b* is 0, processing occurs such that the value of b1* after the optimization is also 0, as in equation (6). This is done because when the color of the pixel is achromatic where the values of chromaticity components a* and b* are both 0, these values must be maintained at 0.

$$b1^* = 128/b^*\text{max} \times b^* \qquad (7)$$

Provided, however, $0 \leq b^* \leq b^*\text{max}$ $$b1^* = 127/|b^*\text{min}| \times (b^* - b^*\text{min}) - 127 \qquad (7)$$

Provided, however, $b^*\text{min} \leq b^* \leq 0$

Figure 6C:
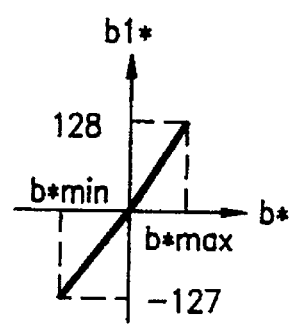

This calculation is based on the graph shown in FIG. 6(c). In other words, the calculation of equation (7) converts the values of chromaticity component b* that are distributed in a 0–b*max range into values that are distributed in a 0–128 range and the values of chromaticity component b* that are distributed in a b*min–0 range into values that are distributed in a –127–0 range.

Image data (L*, a*, b*), largest values L*max, a*max and b*max and smallest values L*min, a*min and b*min used in equations (5) through (7) are stored in hard disk 614 and used during the color area reverse conversion process.

The calculations described above are carried out for the following reason. During coding and decoding using the GBTC method, division is frequently used as shown in equations (1) through (4) above, and as a result, where the differences between component data for each pixel are small, the differences disappear during calculation and the reproducibility of the image data obtained through decoding consequently decreases. In color area optimizing unit 603, the distribution of lightness component L* is converted into values distributed within a 0–255 range and the distributions of chromaticity components a* and b* into values distributed within a –127 to +128 range through the calculations described above. As a result of these changes, reductions in reproducibility are reduced.

Coding/decoding unit 604 carries out coding using the GBTC method, after which it determines the attribute of the image on a block basis and again compresses the coded data (gradation range index LD, average value information LA, coded data Φij) based on the result of the determination. Here the attribute of the image refers to solid monochrome image, solid color image, binary monochrome image, multi-value monochrome image or full-color image. The compressed data obtained through the second compression is stored in compressed image memory 610. Flags f1, f2 and f3 that indicate the attribute of the image are stored in hard disk 614. When decoding is carried out, CPU 611 reads compressed data corresponding to the respective addresses from compressed image memory 610 into coding/decoding unit 604 and at the same time it reads flags f1, f2 and f3 that indicate the attribute of the image from hard disk 614. Coding/decoding unit 604 extends the re-compressed data into coded data (gradation range index LD, average value information LA and coded data Φij) based on the values of flags f1, f2 and f3 that indicate the attribute of the image. The data coded in accordance with the GBTC method is then decoded, whereupon lightness component L2* and chromaticity components a2* and b2* of the image data are output.

Figure 7A:
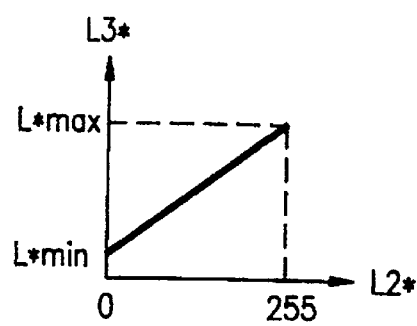
FIG. 7($a$) is a graph used in the color area reverse optimization process with regard to lightness component L*.
Figure 7B:
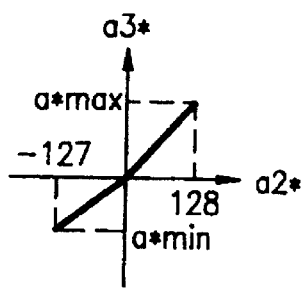
Figure 7C:
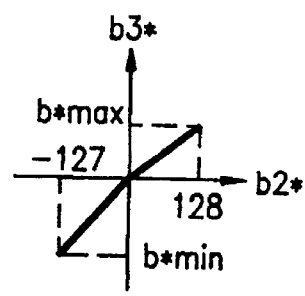

Color area reverse optimizing unit 605 reads largest values L*max, a*max and b*max and smallest values L*min, a*min and b*min from hard disk 614 and returns the distributions of decoded L2*, a2* and b2* data to the L*max–L*min, a*max–a*min and b*max–b*min ranges, respectively, using the values thus read. These processes are carried out based on the graphs shown in FIGS. 7(a) through 7(c). In other words, lightness component L2* is returned to lightness component L3* whose data is distributed within the L*max–L*min range through the calculation of equation (8) shown below.

$$L3^* = (L^*\text{max} - L^*\text{min})/255 \times L2^* + L^*\text{min} \qquad (8)$$

Chromaticity component a* is returned to chromaticity component a3* whose data is distributed within the a*max–a*min range through the calculation of equation (9) shown below.

$$a3^* = a^*\text{max}/128 \times a2^* \qquad (9)$$

Provided, however, $0 \leq a^* \leq 128$ $$a3^* = 127/|a^*\text{min}| \times (a^* + 127) + a^*\text{min} \qquad (9)$$

Provided, however, $-127 \leq a^* \leq 0$

Chromaticity component b* is returned to chromaticity component b3* whose data is distributed within the b*max–b*min range through the calculation of equation (10) shown below.

$$b3^* = b^*\text{max}/128 \times b2^* \qquad (10)$$

Provided, however, $0 \leq b^* \leq 128$ $$b3^* = 127/|b^*\text{min}| \times (b^* + 127) + b^*\text{min} \qquad (10)$$

Provided, however, $-127 \leq b^* \leq 0$

Color area reverse converting unit 606 performs reverse conversion of L3*, a3* and b3* data decoded by color area reverse optimizing unit 605 into OR1, OG1 and OB1 RGB image data, respectively. Reflection/density converting unit 607 carries out a prescribed reflection/density conversion process with regard to the OR1, OG1 and OB1 RGB image data and then outputs DR, DG and DB density data. The RGB image data converted into density data is converted into image data for one of the colors of cyan, magenta, yellow or black in masking unit 608 and is then output to image data correcting unit 201. Image data correcting unit 201 carries out a prescribed gradation correction (γ correction) process with regard to the gradation data output from masking unit 608, and then outputs this gradation data to printer exposure unit 202.

Figure 8:
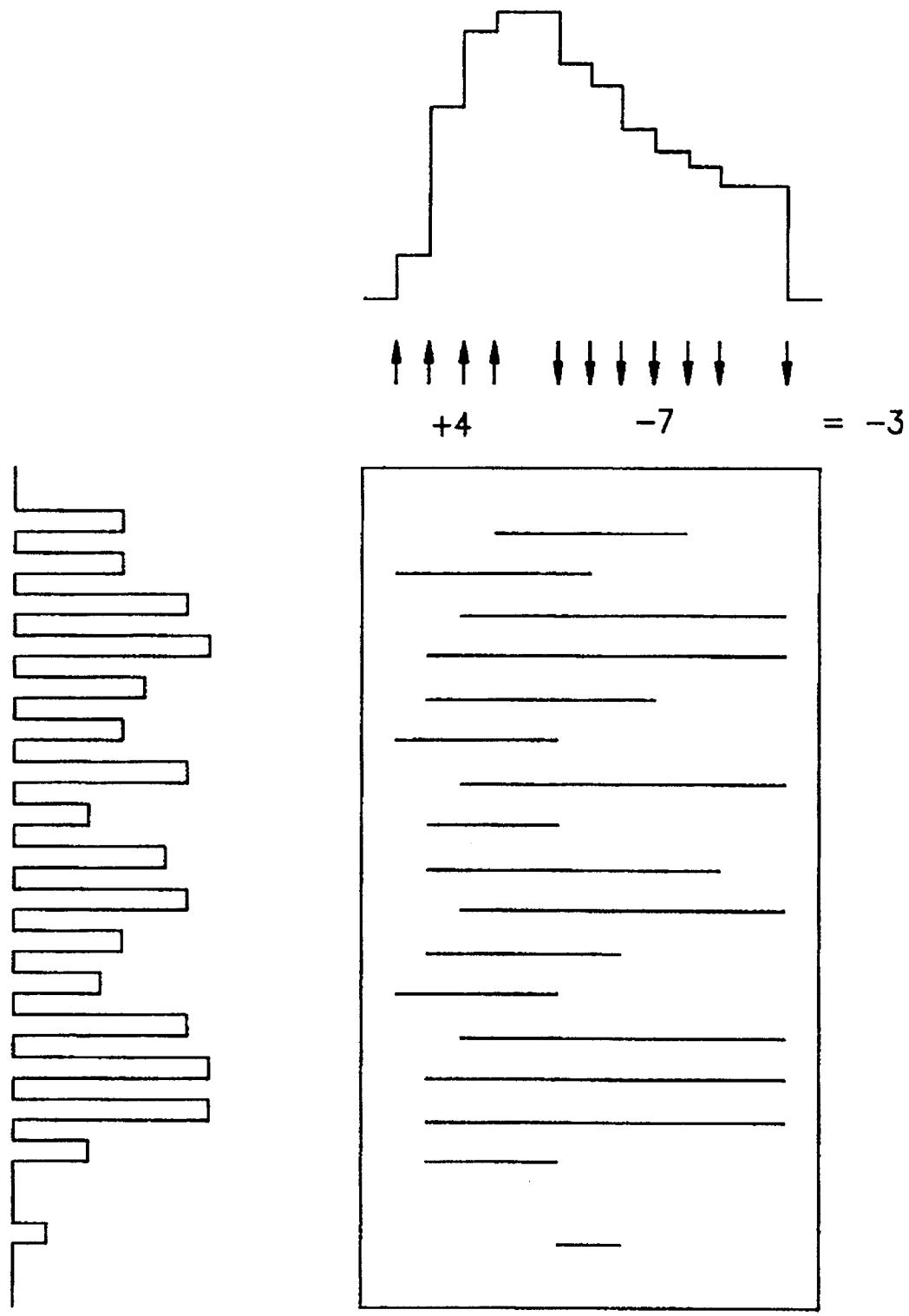
FIG. 8 shows a representative document in which letters are horizontally aligned.

(3) Orientation Identification Process (3-1) Orientation Identification Process (3-1-1) Letter Image Characteristics FIG. 8 shows a representative document in which letters are aligned laterally. In the drawing, black lines represents a letter image and other areas represent blank areas. Histograms pertaining to the letters are shown to the left of and above the document. In this document image, there are a centered title and page number and three headings. Each heading has a paragraph or paragraphs comprising several sentences. The paragraphs are shifted to the right by several letters in comparison with the headings by means of tab setting, etc. The first lines of the paragraphs are also shifted to the right by one letter. This document is written beginning at the upper left, and line change takes place for a different heading or context. After a line change, writing is resumed beginning on the left side and continues toward the lower right.

Letter distribution histograms are obtained with regard to the primary and secondary scanning directions. As explained above, the value of gradation range index LD obtained during coding using the GBTC method comprises information regarding the gap in gradation among pixels of a block. A letter image is a binary image. The gap in gradation among pixels of a block that belongs to a letter image therefore is larger than that among pixels of a block belonging to a half-tone image. Therefore, in this copy machine, a block whose value of gradation range index LD that is obtained per block is equal to or larger than a prescribed value is determined to be a block belonging to a letter image. Primary and secondary scanning direction histograms are then obtained for blocks that are determined to belong to a letter image. Accordingly, the histograms are prepared based on coded image data. In this way, the amount of data used in the orientation identification process is reduced to $\frac{1}{16}$. The determination as to whether or not a block belongs to a letter image is not limited to the method described above. It is also acceptable to determine that a block belongs to a letter image when the value of gradation range index LD allocated to that block is equal to or larger than a prescribed value and coded data $\Phi ij$ allocated to the block's pixels is comprised of only '11' or '01', because this invention is characterized by the fact that the determination of blocks that belong to a letter image is performed using data (average value information LA, gradation range index LD, coded data $\Phi ij$) obtained for each block through coding via the GBTC method, primary and secondary scanning direction histograms are obtained for blocks determined to belong to a letter image, and the identification of the document orientation is performed based on the histograms thus obtained.

The number of change points in the histograms for blocks determined to belong to a letter image are counted considering the direction of the change points. Consequently, in the direction perpendicular to the alignment of letters (the vertical direction in FIG. 8), the total of the number of edges rising (hereinafter called plus edges) and the number of edges falling (hereinafter called minus edges) is much larger in comparison with the histogram for the direction of the alignment of letters (the lateral direction in FIG. 8). This copy machine identifies the orientation of the alignment of letters and the orientation of the document by using this letter image characteristic.

In the document shown in FIG. 8, it can be seen from the histogram for the direction of the alignment of letters (the lateral direction in FIG. 8) that the number of minus edges is larger than the number of plus edges. This is because although the place where a sentence starts, i.e., the location of the first letter of a sentence, varies depending on the setting of a heading or a tab, once a tab is set, sentences tend to start using the same tab, or in other words, sentences tend to start at the same indentation. On the other hand, the location at which a sentence ends varies, and therefore edges representing the ends of sentences occur at various times as well. Accordingly, with regard to the histogram shown above the document in FIG. 8, the number of minus edges tends to be larger than the number of plus edges. Using this letter image characteristic, the locations at which lines start can be identified based on the relationship between the number of plus edges and the number of minus edges. In the document shown in FIG. 8, while the centered lines start and end differently from the rest of the document, since they have one plus edge and one minus edge, they do not affect the result of the orientation identification process.

Figure 9:
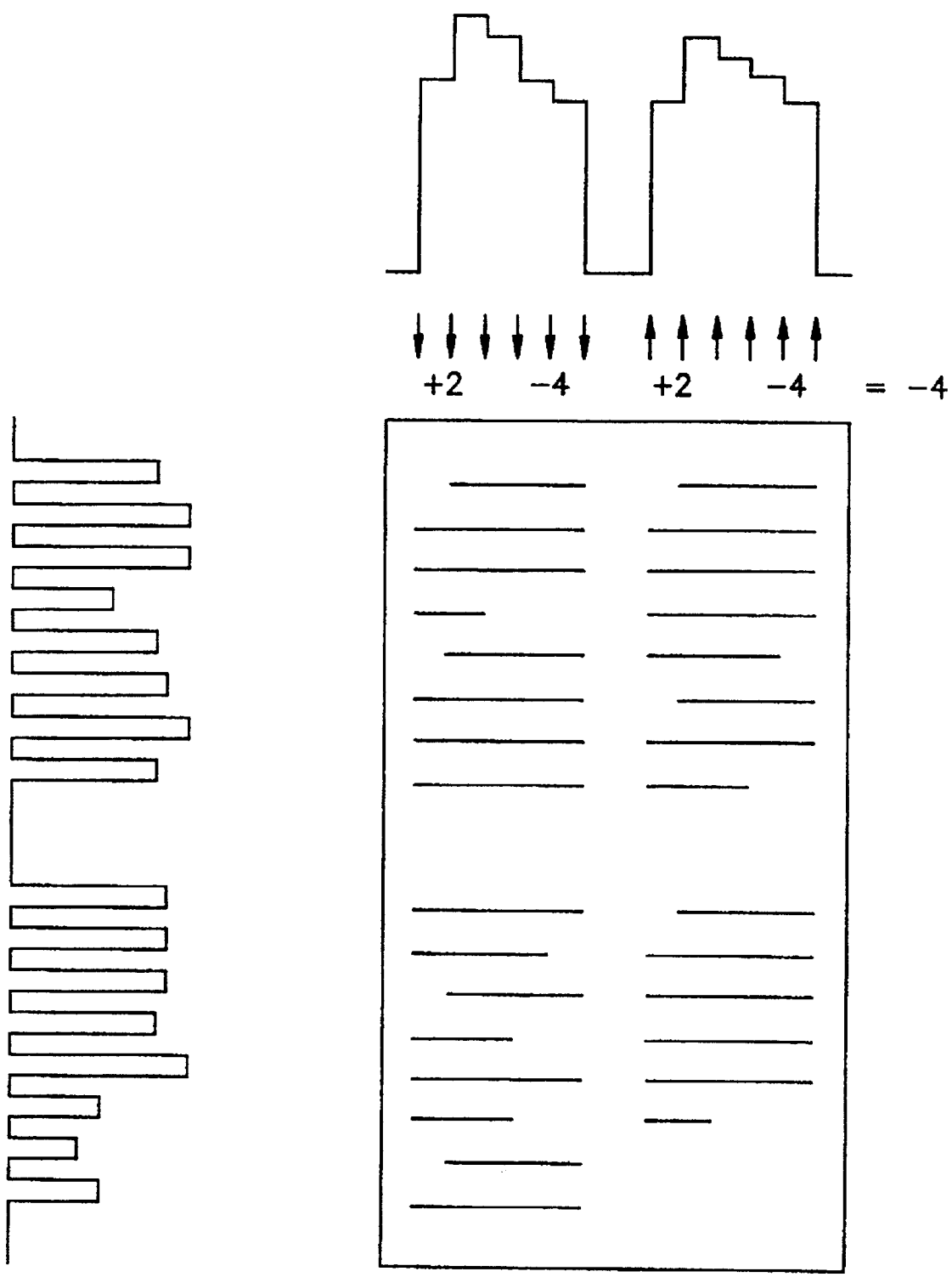
FIG. 9 shows a document comprising a columnized horizontally-written document.

FIG. 9 shows a document comprising columnized laterally-written lines. In the drawing, black lines represent letters and other areas represent blank areas. In FIG. 9 as well as in FIG. 8, letter distribution histograms are shown to the left of and above the document. This document has the same settings as the document shown in FIG. 8 except that it is columnized. In this document, as in the document shown in FIG. 8, the direction of the alignment of letters can be identified from the totals of the number of plus and minus edges in the primary and secondary scanning direction histograms, and the locations at which lines start can be identified from the relationship between the plus and minus edges in the histogram for the direction of the alignment of letters. The differences between the document shown in FIG. 8 and the document shown in FIG. 9 have to do with whether or not the document is columnized. However, these differences do not affect the result of the orientation identification process, because although steps appear in the center of the histograms, each of these steps also has one plus edge and one minus edge.

Figure 10:
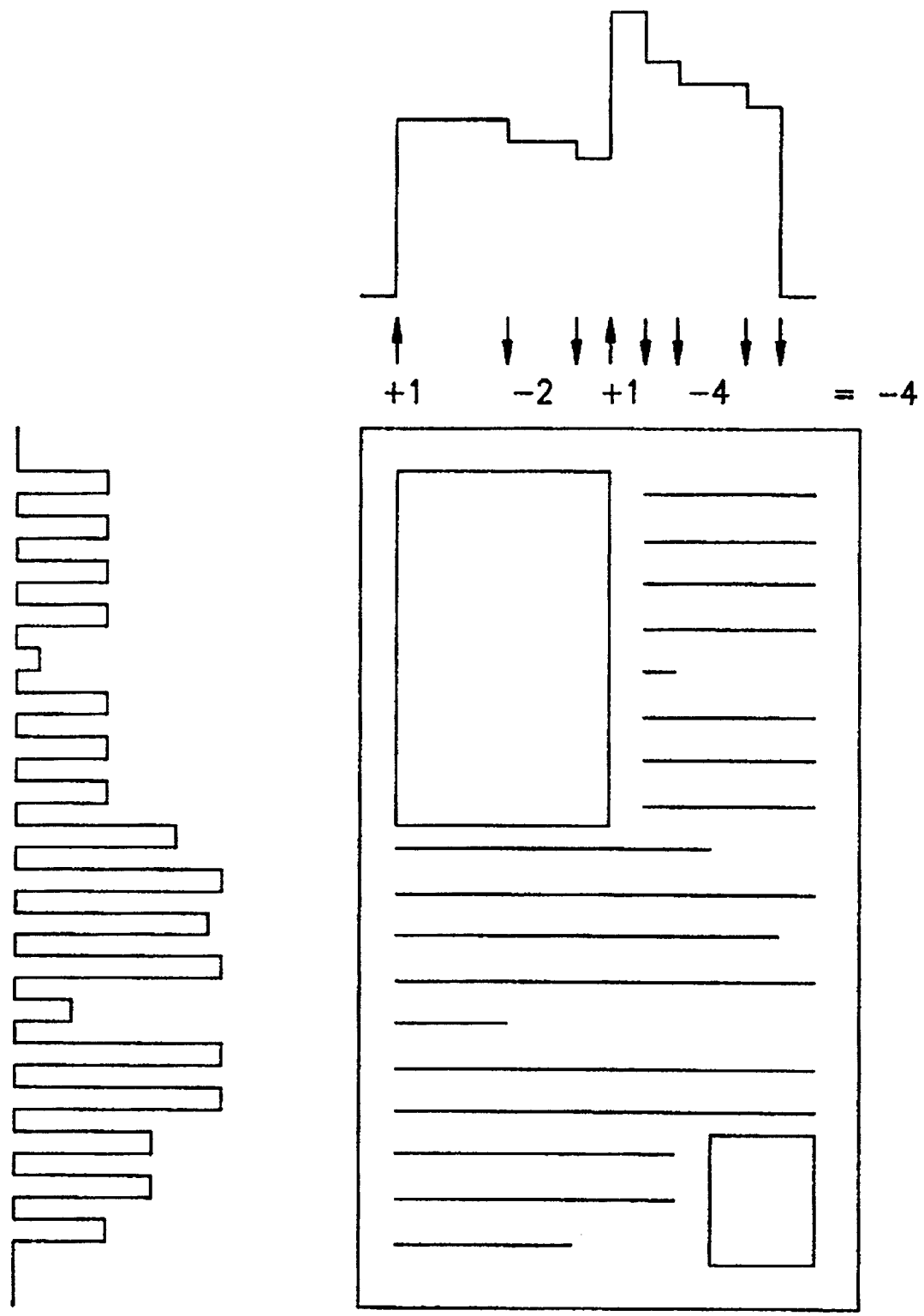
FIG. 10 shows a document including half-tone images such as photographs.

FIG. 10 shows a document including letters and half-tone images such as photographs. In the drawing, black lines represent a letter image and black frames represent half-tone images. Areas other than these represent blank areas. Letter distribution histograms are shown to the left of and above the document in FIG. 10, as in FIG. 8. The document shown in FIG. 10 is the same as the document shown in FIG. 8 except that it contains half-tone images. In this document, as in the document shown in FIG. 8, the direction of the alignment of letters can be identified from the totals of the number of plus and minus edges in the primary and secondary scanning direction histograms, and the locations at which lines begin can be identified from the relationship between the plus and minus edges in the histogram for the direction of the alignment of letters. The differences between the document shown in FIG. 10 and the document shown in FIG. 8 have to do with whether or not the document includes half-tone images. A general half-tone image has few edges and therefore affects the histogram only slightly. Therefore, the level of the histogram is slightly lowered at the areas where there is a half-tone image in the document, but the number of plus edges and minus edges do not change significantly and the result of the orientation identification process is not affected.

(3-1-2) Outline of the Orientation Identification Process

Figure 11:
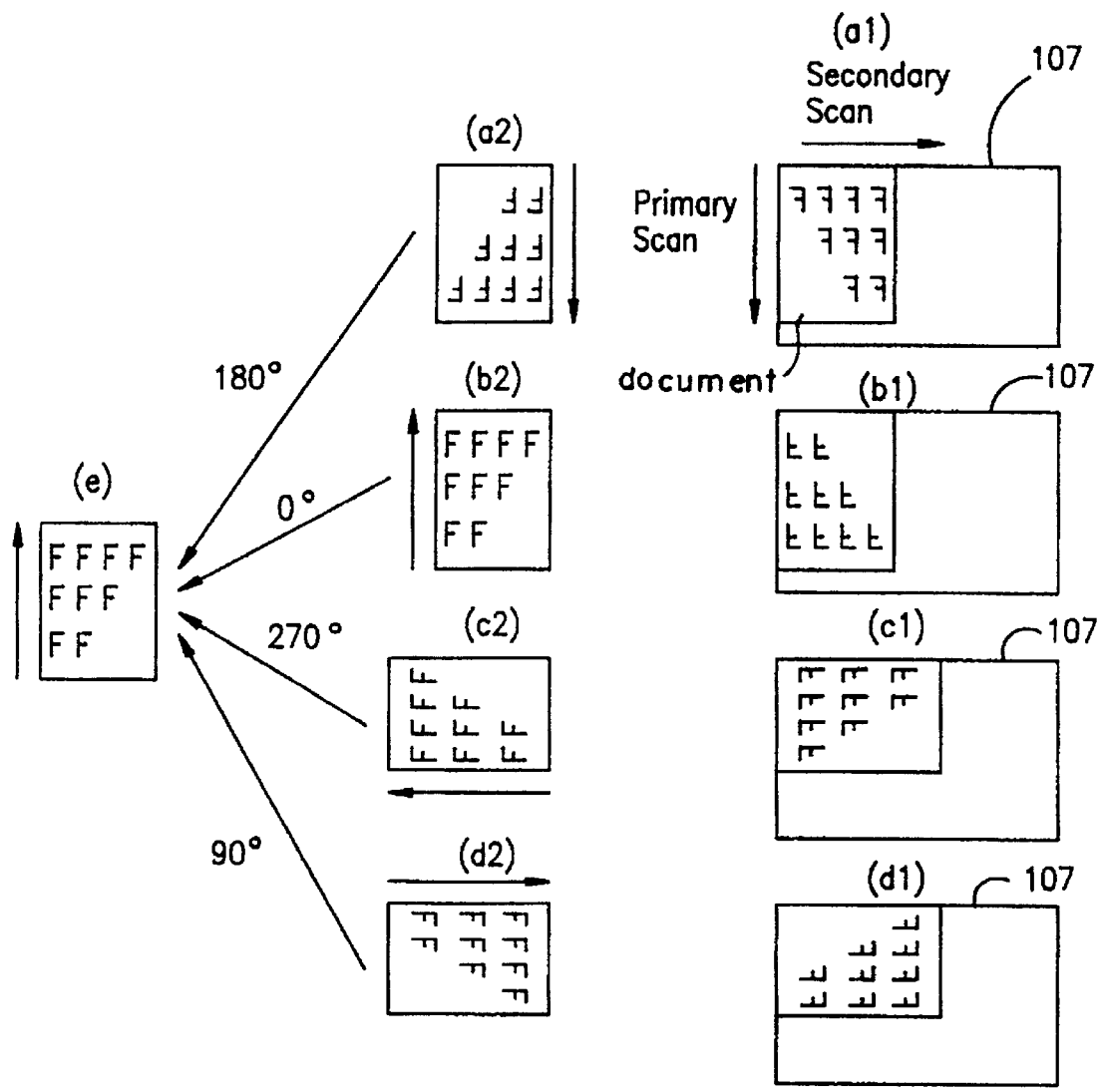
FIG. 11 shows the relationships between the orientation of the document and the orientation of image output on the copy paper.

FIG. 11 shows the manner in which the document is placed on platen glass 107 and the image is output onto the copy paper. Where the document is placed on platen glass 107 as shown in FIG. 11(*a*1), the document image data read by CCD sensor 104 is stored in compressed image memory 610 as shown in (a2) after being coded by the coding unit according to the GBTC method. In order to obtain copy output with proper orientation from the viewpoint of the operator, the data read from compressed image memory 610 must be rotated 180 degrees before it is decoded into RGB image data and output to printer exposure unit 202. As shown in FIG. 11(*a*1), where the alignment of the letters of the document placed on platen glass 107 coincides with the secondary scanning direction, the number of edges in the histogram for the primary scanning direction becomes larger than the number of edges of the histogram for the secondary scanning direction. In addition, when the line beginnings are on the right side in the drawing, the number of plus edges becomes larger than the number of minus edges in the histogram for the direction of the alignment of letters, or in other words, for the secondary scanning direction. Therefore, in this copy machine, where the histograms for the document image data read meet said conditions, the data read from compressed image memory 610 is rotated 180 degrees before it is decoded into RGB image data and output to printer exposure unit 202.

Where the document is placed on platen glass 107 as shown in FIG. 11(*b*1), the document image data read by CCD sensor 104 is stored in compressed image memory 610 as shown in (b2) after being coded by the coding unit according to the GBTC method. In order to obtain copy output with proper orientation from the viewpoint of the operator, the data read from compressed image memory 610 should be decoded into RGB image data and output to printer exposure unit 202 without any rotation. As shown in FIG. 11(*b*1), where the alignment of the letters of the document placed on platen glass 107 coincides with the secondary scanning direction, the number of edges of the histogram for the primary scanning direction becomes larger than the number of edges of the histogram for the secondary scanning direction. In addition, when the line beginnings are on the left side in the drawing, the number of plus edges becomes smaller than the number of minus edges in the histogram for the direction of the alignment of letters, or in other words, for the secondary scanning direction. Therefore, in this copy machine, where the histograms for the document image data read meet said conditions, the data read from compressed image memory 610 is decoded into RGB image data and output to printer exposure unit 202 without any rotation.

Where the document is placed on platen glass 107 as shown in FIG. 11(*c*1), the document image data read by CCD sensor 104 is stored in compressed image memory 610 as shown in (c2) after being coded in the coding unit according to the GBTC method. In order to obtain copy output with proper orientation from the viewpoint of the operator, the data read from compressed image memory 610 must be rotated 270 degrees before it is decoded into RGB image data and output to printer exposure unit 202. As shown in FIG. 11(*c*1), where the alignment of the letters of the document placed on platen glass 107 coincides with the primary scanning direction, the number of edges of the histogram for the primary scanning direction becomes smaller than the number of edges of the histogram for the secondary scanning direction. In addition, when the line beginnings are on the upper side in the drawing, the number of plus edges becomes larger than the number of minus edges in the histogram for the direction of the alignment of letters, or in other words, for the primary scanning direction. Therefore, in this copy machine, where the histograms for the document image data read meet said conditions, the data read from compressed image memory 610 is rotated 270 degrees before it is decoded into RGB image data and output to printer exposure unit 202.

Where the document is placed on platen glass 107 as shown in FIG. 11(*d*1), the document image data read by CCD sensor 104 is stored in compressed image memory 610 as shown in (d2) after being coded in the coding unit according to the GBTC method. In order to obtain copy output with proper orientation from the viewpoint of the operator, the data read from compressed image memory 610 must be rotated 90 degrees before it is decoded into RGB image data and output to printer exposure unit 202. As shown in FIG. 11(*d*1), where the alignment of the letters of the document placed on platen glass 107 coincides with the primary scanning direction, the number of edges of the histogram for the primary scanning direction becomes smaller than the number of edges of the histogram for the secondary scanning direction. In addition, when the line beginnings are on the lower side in the drawing, the number of plus edges becomes smaller than the number of minus edges in the histogram for the direction of the alignment of letters, or in other words, in the primary scanning direction. Therefore, in this copy machine, where the histograms for the document image data read meet said conditions, the data read from compressed image memory 610 is rotated 90 degrees before it is decoded into RGB image data and output to printer exposure unit 202.

(3-1-3) Image Rotation Process

Figure 12:
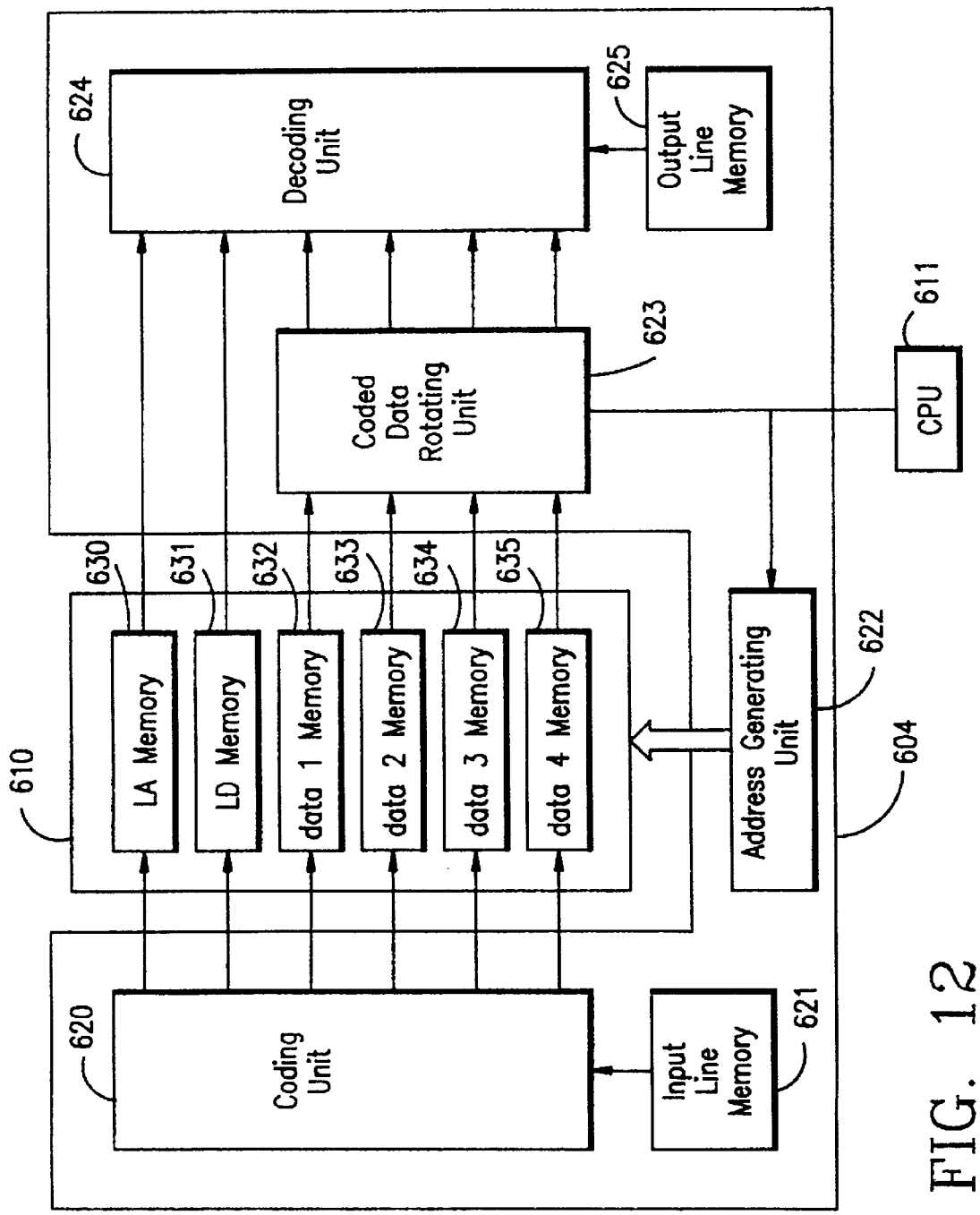
FIG. 12 shows the constructions of the coding and decoding units and compressed image memories.

FIG. 12 is a circuit diagram of coding/decoding unit 604 and compressed image memory 610. Lightness component L1* and chromaticity components a1* and b1* input from color area optimizing unit 603 are separately processed by coding/decoding unit 604. Therefore, there are actually three circuits identical to the one shown in FIG. 12 for rightness component L1*, chromaticity component a1* and chromaticity component b1*, respectively. The nature of the processing is the same for all of lightness component L1* and chromaticity components a1* and b1*. The processing with regard to lightness component L1* will be explained in this embodiment with reference to FIG. 12 in order to avoid repetition in explanation.

The serial data input for lightness component L1* is divided into data on a block-by-block basis, each block comprising a 4×4 pixel matrix, by input line memory 621. Coding unit 620 carries out the coding routine using the GBTC method with regard to the data input per block. The coded data output from coding unit 620 includes one-byte average value information LA, one-byte gradation range index LD and four-byte coded data Φij. Average value information LA is stored in LA memory 630 in compressed image memory 610. Gradation range index LD is stored in LD memory 631 in compressed image memory 610. Coded data Φ11 through Φ14 is stored in data1 memory 632. Coded data Φ21 through Φ24 is stored in data2 memory 633. Coded data Φ31 through Φ34 is stored in data3 memory 634. Coded data Φ41 through Φ44 is stored in data4 memory 635. The addresses for this writing of data are generated by address generating unit 622.

When the image data is decoded, CPU 611 outputs to address generating unit 622 and coded data rotating unit 623 the information regarding the image rotation angle (0, 90, 180 or 270 degrees) that is set in the orientation identification process explained below with reference to a flow chart. Address generating unit 622 forms prescribed read addresses based on the rotation angle information input from CPU 611 and outputs them to compressed image memory 610. Compressed image memory 610 outputs coded data for blocks that correspond to the read addresses input from address generating unit 622. Coded data rotating unit 623 realigns coded data Φij input from compressed image memory 610 in accordance with the rotation angle information input from CPU 611 and outputs the realigned coded data to decoding unit 624. Decoding unit 624 carries out the decoding routine with regard to the coded data input on a block basis (average value information LA, gradation range index LD, coded data Φij) using the GBTC method, and outputs lightness component L2*. Output line memory 625 converts lightness component L2* data decoded on a block basis into the original serial data and outputs it to color area reverse optimizing unit 605.

The generation of read addresses by address generating unit 622 is explained below. Printer exposure unit 202 emits laser beams based on the image data input and forms an electrostatic latent image on photoreceptor drum 204. The laser beams are irradiated onto photoreceptor drum 204 in the direction opposite to the primary scanning direction and then in the secondary scanning direction. The arrow next to the document shown in FIG. 11(*e*), which is shown to the left of FIG. 11, indicates the direction in which the electrostatic latent image is formed on photoreceptor drum 204. Where the rotation angle information input from CPU 611 is 180 degrees, address generating unit 622 generates read addresses according to which coded data per block stored in compressed image memory 610 is read in the direction indicated by the arrow in FIG. 11(*a*2). Here, the address that specifies the location of a block in compressed image memory 610 is expressed as x, y. The number of blocks aligned in the primary scanning direction is deemed WX and the number of blocks aligned in the secondary scanning direction is deemed WY. Address generating unit 622 generates read addresses X and Y using equation (11) shown below.

$$X = (WX-1) - x \quad (11)$$

$$Y = (WY-1) - y \quad (11)$$

Where the rotation angle information input from CPU 611 is 0 degrees, address generating unit 622 generates read addresses, according to which coded data per block stored in compressed image memory 610 is read in the direction indicated by the arrow in FIG. 11(*b*2), using equation (12) shown below.

$$X = x \quad (12)$$

$$Y = y \quad (12)$$

Where the rotation angle information input from CPU 611 is 270 degrees, address generating unit 622 generates read addresses, according to which coded data per block stored in compressed image memory 610 is read in the direction indicated by the arrow in FIG. 11(*c*2), using equation (13) shown below.

$$X = (WY-1) - y \quad (13)$$

$$Y = x \quad (13)$$

Where the rotation angle information input from CPU 611 is 90 degrees, address generating unit 622 generates read addresses, according to which coded data per block stored in compressed image memory 610 is read in the direction indicated by the arrow in FIG. 11(*d*2), using equation (14) shown below.

$$X = y \quad (14)$$

$$Y = (WX-1) - x \quad (14)$$

Figure 13:
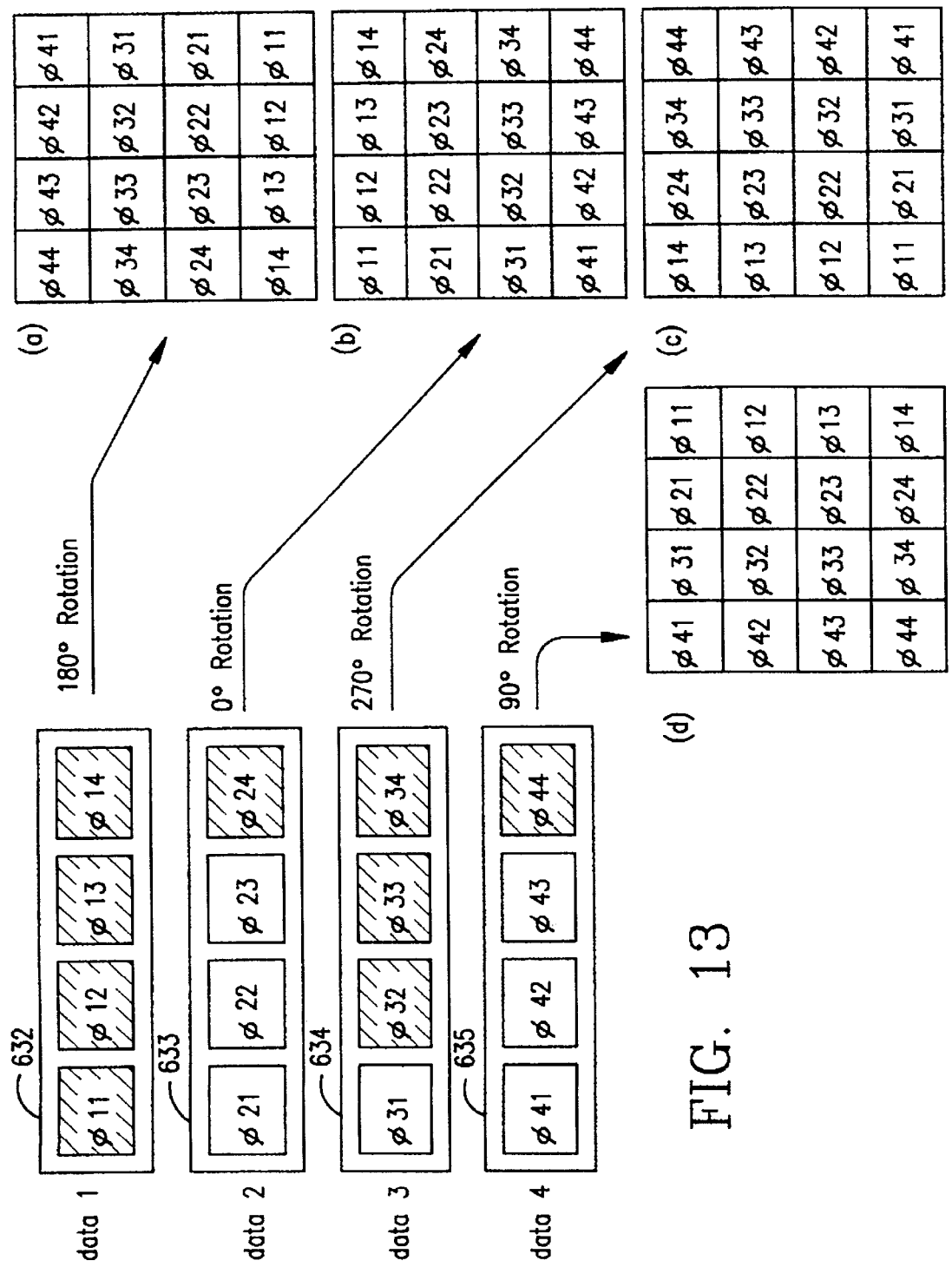
FIG. 13 shows coded data output by the coded data rotating unit.

FIG. 13 is a drawing to explain the content of coded data output by coded data rotating unit 623 based on the rotation angle information input from CPU 611, in relation to the coded data output from data1 memory 632, data2 memory 633, data3 memory 634 and data4 memory 635 in compressed image memory 610. Coded data Φ11 through Φ14 is sequentially output from data1 memory 632. Coded data Φ21 through Φ24 is sequentially output from data2 memory 633. Coded data Φ31 through Φ34 is sequentially output from data3 memory 634. Coded data Φ41 through Φ44 is sequentially output from data4 memory 635.

Where the rotation angle information input from CPU 611 is 180 degrees, coded data rotating unit 623 outputs Φ44, Φ43, Φ42 and Φ41 in that order as data 1, Φ34, Φ33, Φ32 and Φ31 in that order as data 2, Φ24, Φ23, Φ22 and Φ21 in that order as data 3 and Φ14, Φ13, Φ12 and Φ11 in that order as data 4, as shown in FIG. 13(*a*).

Where the rotation angle information input from CPU 611 is 0 degrees, coded data rotating unit 623 outputs Φ11, Φ12, Φ13 and Φ14 in that order as data 1, Φ21, Φ22, Φ23 and Φ24 in that order as data 2, Φ31, Φ32, Φ33 and Φ34 in that order as data 3 and Φ41, Φ42, Φ43 and Φ44 in that order as data 4, as shown in FIG. 13(*b*).

Where the rotation angle information input from CPU 611 is 270 degrees, coded data rotating unit 623 outputs Φ14, Φ24, Φ34 and Φ44 in that order as data 1, Φ13, Φ23, Φ33 and Φ43 in that order as data 2, Φ12, Φ22, Φ32 and Φ42 in that order as data 3 and Φ11, Φ21, Φ31 and Φ41 in that order as data 4, as shown in FIG. 13(*c*).

Where the rotation angle information input from CPU 611 is 90 degrees, coded data rotating unit 623 outputs Φ41, Φ31, Φ21 and Φ11 in that order as data 1, Φ42, Φ32, Φ22 and Φ12 in that order as data 2, Φ43, Φ33, Φ23 and Φ13 in that order as data 3 and Φ44, Φ34, Φ24 and Φ14 in that order as data 4, as shown in FIG. 13(*d*).

(3-2) Main Routine

Figure 14:
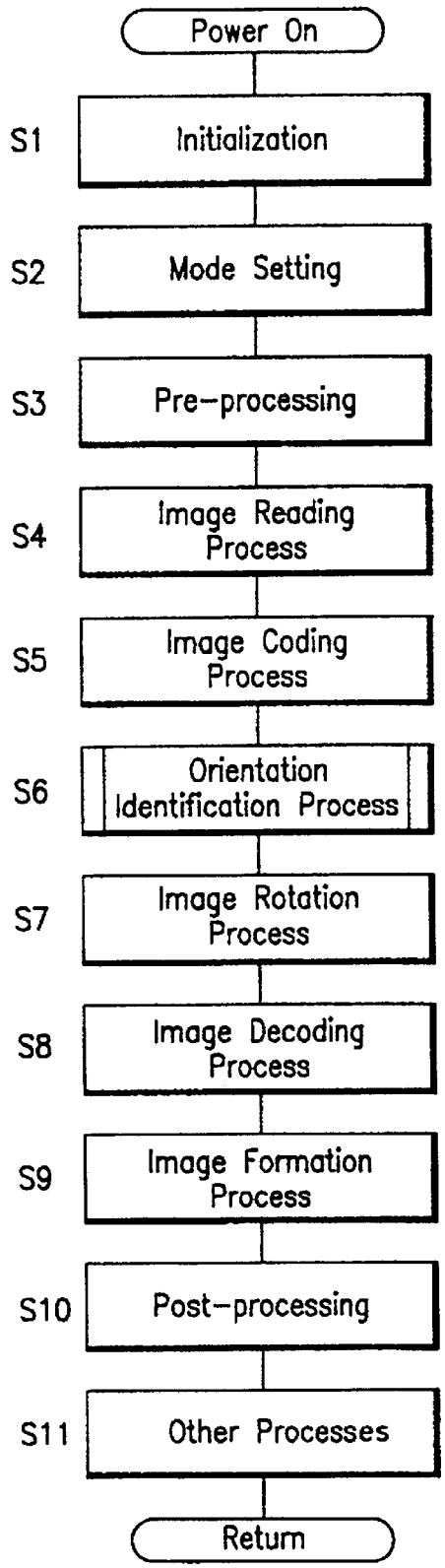
FIG. 14 is a flow chart showing the copy machine control sequence.

FIG. 14 is a flow chart showing the control sequence for the entire copy machine after the power is turned ON. First, initialization of internal variables necessary to control the device as well as of various elements takes place (step S1). The operation mode desired by the operator is then set (step S2). Based on the set mode, pre-processing such as shading for the reading of the document image and preparation of various elements for the formation of an electrostatic latent image take place (step S3). Based on the set mode, image reading in which the scanner and image processing circuits are controlled is executed (step S4). Color area conversion and color area reverse conversion are carried out with regard to the read RGB image data, after which the image is coded according to the GBTC method (step S5). Based on the value of gradation range index LD for the lightness component of the coded data for a block obtained through the coding (average value information LA, gradation range index LD, coded data Φij), letter image density histograms are obtained, based on which the orientation of the document is identified (step S6). The orientation identification process will be explained below.

Based on the information regarding the image rotation angle set through the orientation identification process, the image rotation process is carried out in which the coded data for each block that is stored in compressed image memory 610 is read in a prescribed order (step S7). The image rotation process based on the rotation angle information is as explained above. The coded data obtained as a result of the image rotation process is decoded on a block-by-block basis (step S8). After the color area reverse optimization process and color area reverse conversion process are carried out with regard to the decoded data obtained through the decoding, the image formation process in which an image is formed on copy paper is executed based on the gradation data obtained through prescribed processes such as the reflection/density conversion and masking processes (step S9). After the image formation process, processes necessary to maintain the condition of the device but not directly related to the image forming operation, such as the cleaning of photoreceptor drum 204, are carried out (step S10). Finally, other processes such as temperature control for fusing and communication control, which are not directly related to the operation described above, are executed (step S11). The operation described above is repeated until the power to the device is turned OFF.

(3-3) Orientation Identification Routine

Figure 15:
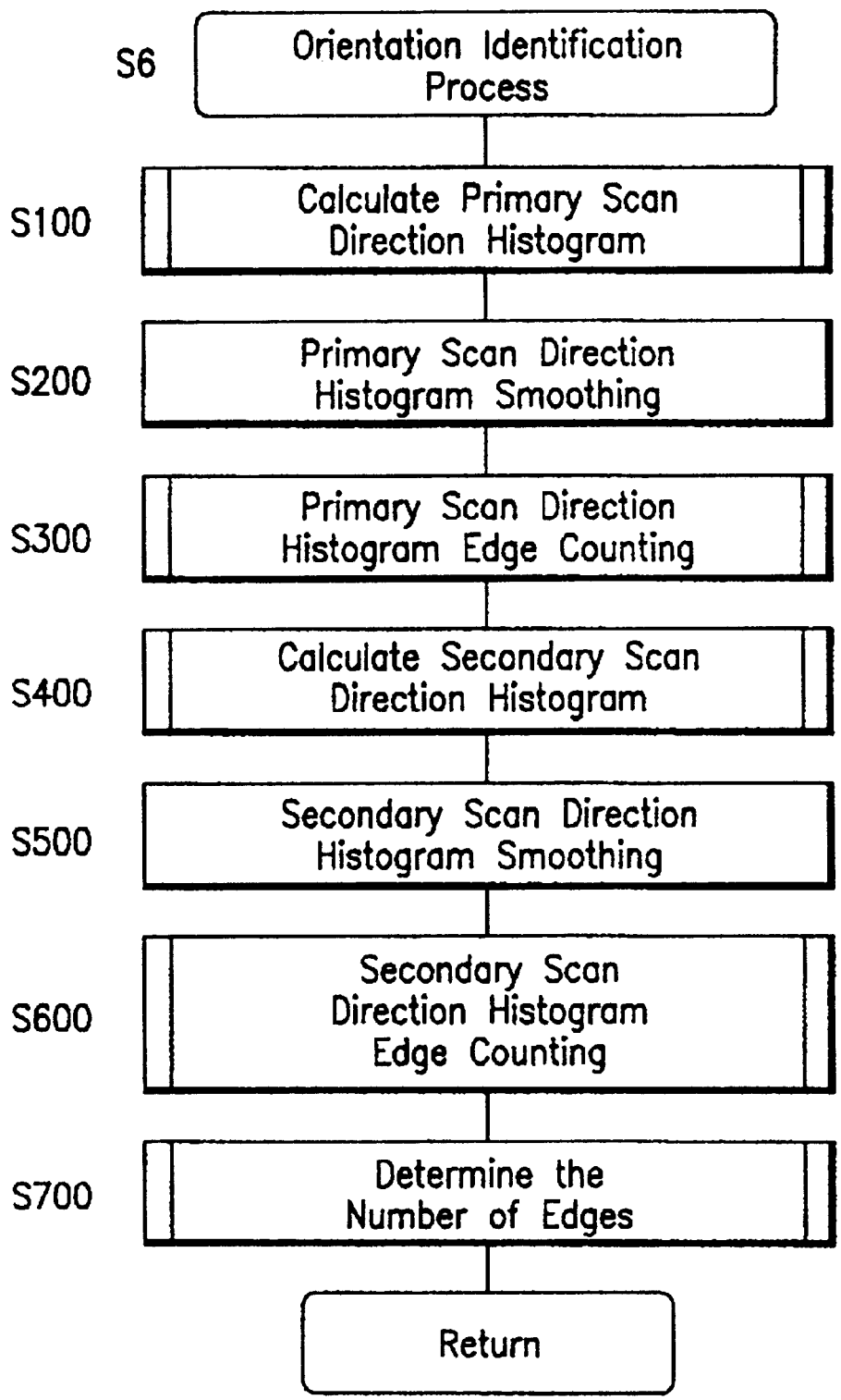
FIG. 15 is a flow chart showing the orientation identification sequence.

FIG. 15 is a flow chart showing the orientation identification sequence (step S6 in FIG. 14). The frequencies of appearance of blocks whose gradation range index LD value exceeds the prescribed level are checked with regard to the primary scanning direction and a histogram is calculated (step S100). Calculation of a primary scanning direction histogram is explained below. In order to reduce the influence of local increases and decreases in histogram data on the result of orientation identification, the calculated histogram is smoothed down (step S200). Specifically, first the smallest among the gradation range index LD values of a block of concern and of blocks in a prescribed range surrounding the block of concern is deemed the value of gradation range index LD of the block of concern. Following this, the largest among the gradation range index LD values of a block of concern and of blocks in a prescribed range surrounding the block of concern is deemed the value of gradation range index LD of the block of concern.

Figure 16:
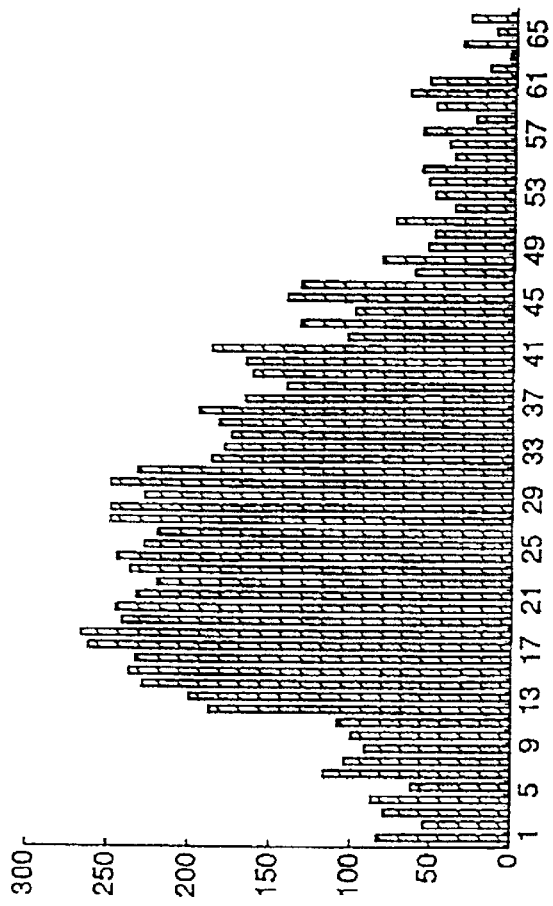
FIG. 16 is a histogram calculated with regard to a letter image.
Figure 17:
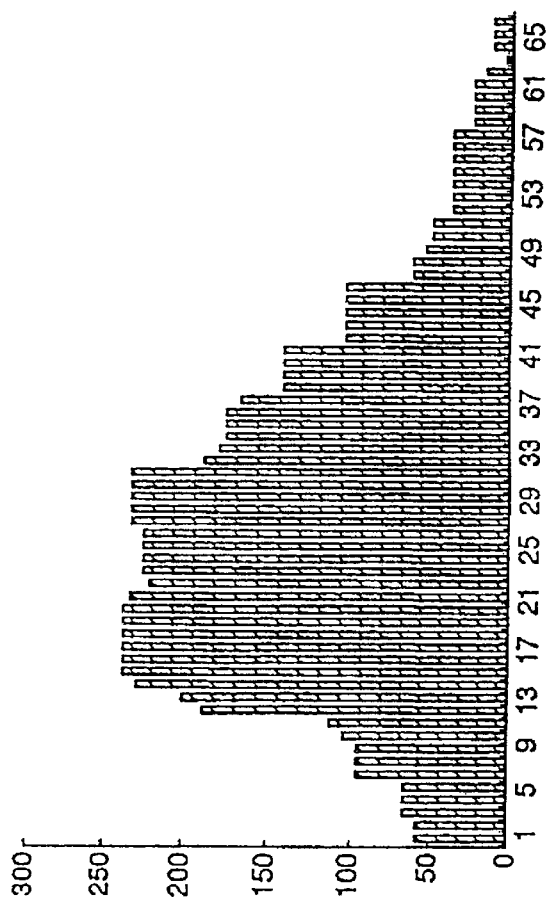
FIG. 17 is a histogram where the values of gradation range index LD of the block of concern and the blocks to the right and left of said block of concern are checked using the histogram data shown in FIG. 16 and the smallest value among them is deemed gradation range index LD of the block of concern.
Figure 18:
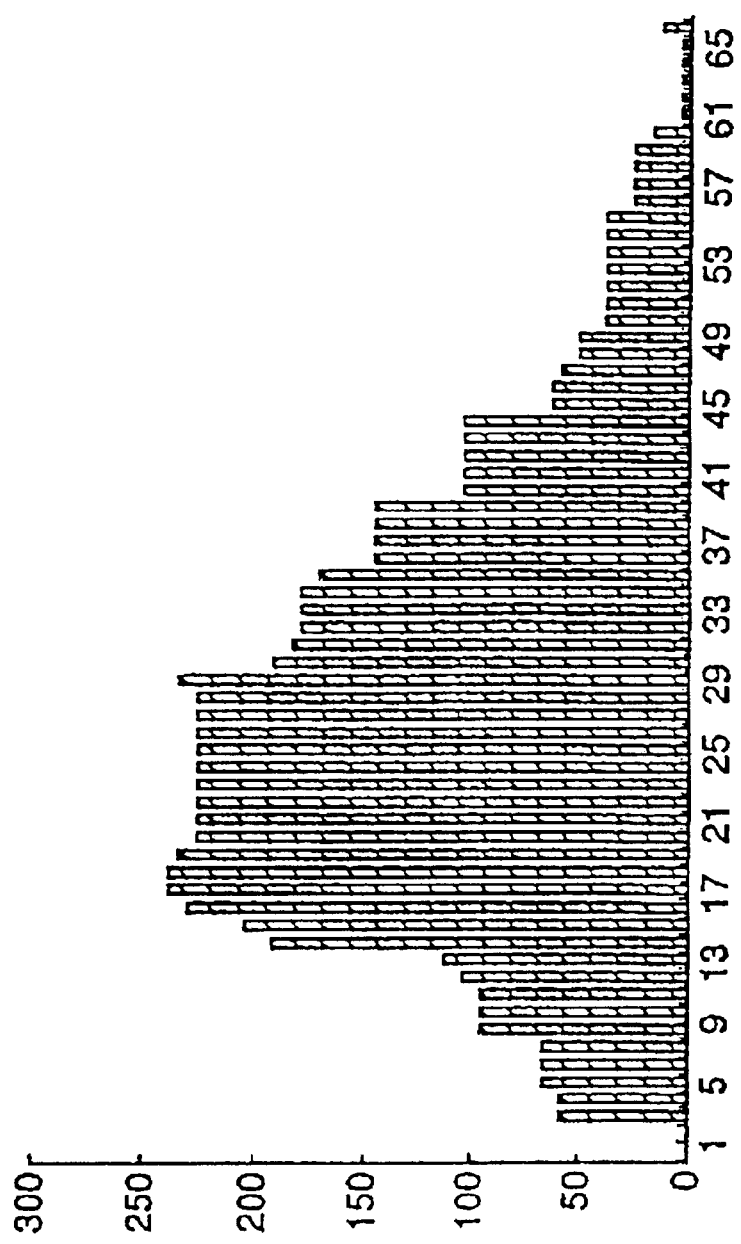
FIG. 18 is a histogram where the values of gradation range index LD of the block of concern and the blocks to the right and left of said block of concern are checked using the histogram data shown in FIG. 17 and the largest value among them is deemed gradation range index LD of the block of concern.

FIG. 16 shows a histogram calculated with regard to a letter image. The horizontal axis of the graph indicates the block number and the vertical axis indicates the number of blocks which are determined to belong to a letter image. The same is true as to FIGS. 17 and 18. The values of gradation range index LD of the line's block of concern and blocks located to the right and left of said block are checked and the smallest among the three is deemed gradation range index LD of the block of concern. FIG. 17 shows a histogram obtained through this processing. After this, the values of gradation range index LD of the block of concern and blocks located to the right and left of said block are checked and the largest among the three is deemed gradation range index LD of the block of concern. The histogram shown in FIG. 18 is obtained through this processing. After a smoothing process is carried out, the points where the frequency value changes significantly (hereinafter called 'edges') are counted (step S300). Edge counting for the primary scanning direction is explained below.

A secondary scanning direction histogram is then calculated (step S400) in the same manner as for the calculation of a primary scanning direction histogram. The calculation of a secondary scanning direction histogram is explained below. Smoothing is carried out with regard to the calculated secondary scanning direction histogram (step S500). After smoothing is carried out, the number of edges is counted (step S600). Edge counting for the secondary scanning direction is explained below. Based on the number of edges for the primary and secondary scanning directions, the number of edges determination process is carried out to identify the orientation and set the image rotation angle (step S700). The number of edges determination process is explained below.

(3-4) Primary Scanning Direction Histogram Calculation Routine

Figure 19:
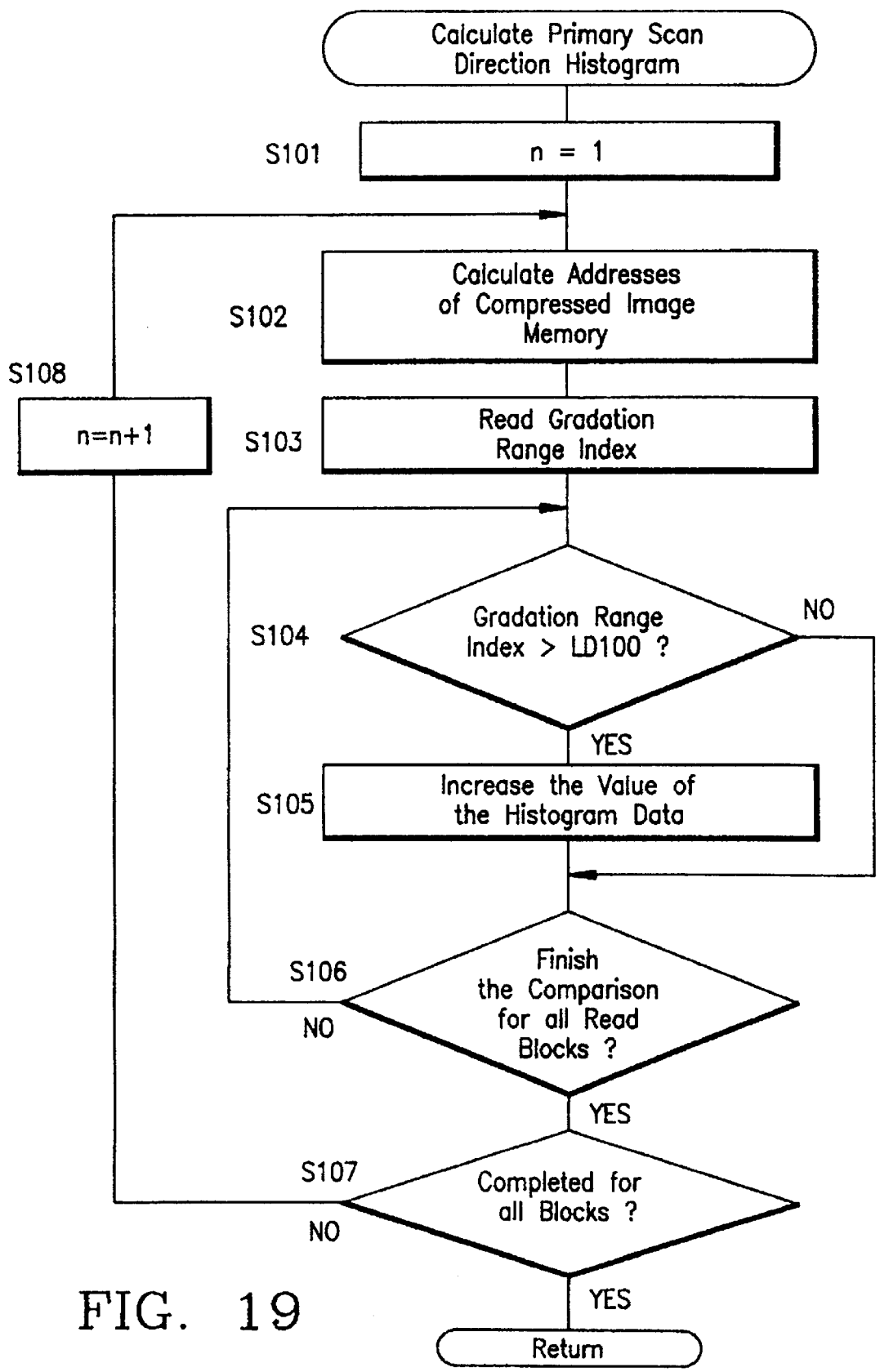
FIG. 19 is a flow chart showing the primary scanning direction histogram calculation sequence.

FIG. 19 is a flow chart showing the primary scanning direction histogram calculation sequence (step S100 in FIG. 15). n=1 is set as the initial setting (step S101). Read addresses to read the values of gradation range index LD of the nth ($1 \leq n \leq WX$) blocks in the primary scanning direction, which are aligned perpendicular to the primary scanning direction, are calculated via compressed image memory 610 (step S102). Based on the read addresses, the values of gradation range index LD of the nth blocks in the primary scanning direction, which are aligned perpendicular to the primary scanning direction, are read (step S103). Where the value of gradation range index LD of the block thus read is equal to or larger than a prescribed threshold value (100 in this embodiment) (YES in step S104), the value of the histogram data for this nth block is increased by one (step S105). The determination of step S104 is repeated until determination as to all of the nth blocks in the primary scanning direction is completed (step S106). In this way, histogram data for the nth blocks in the primary scanning direction is obtained. Where processing regarding all blocks has not been completed (NO in step S107), 1 is added to the value of n (step S108) and the process returns to step S102. When processing is completed for all blocks (YES in step S107), the process returns to the main routine of the orientation identification sequence.

(3-5) Primary Scanning Direction Edge Counting Routine

Figure 20:
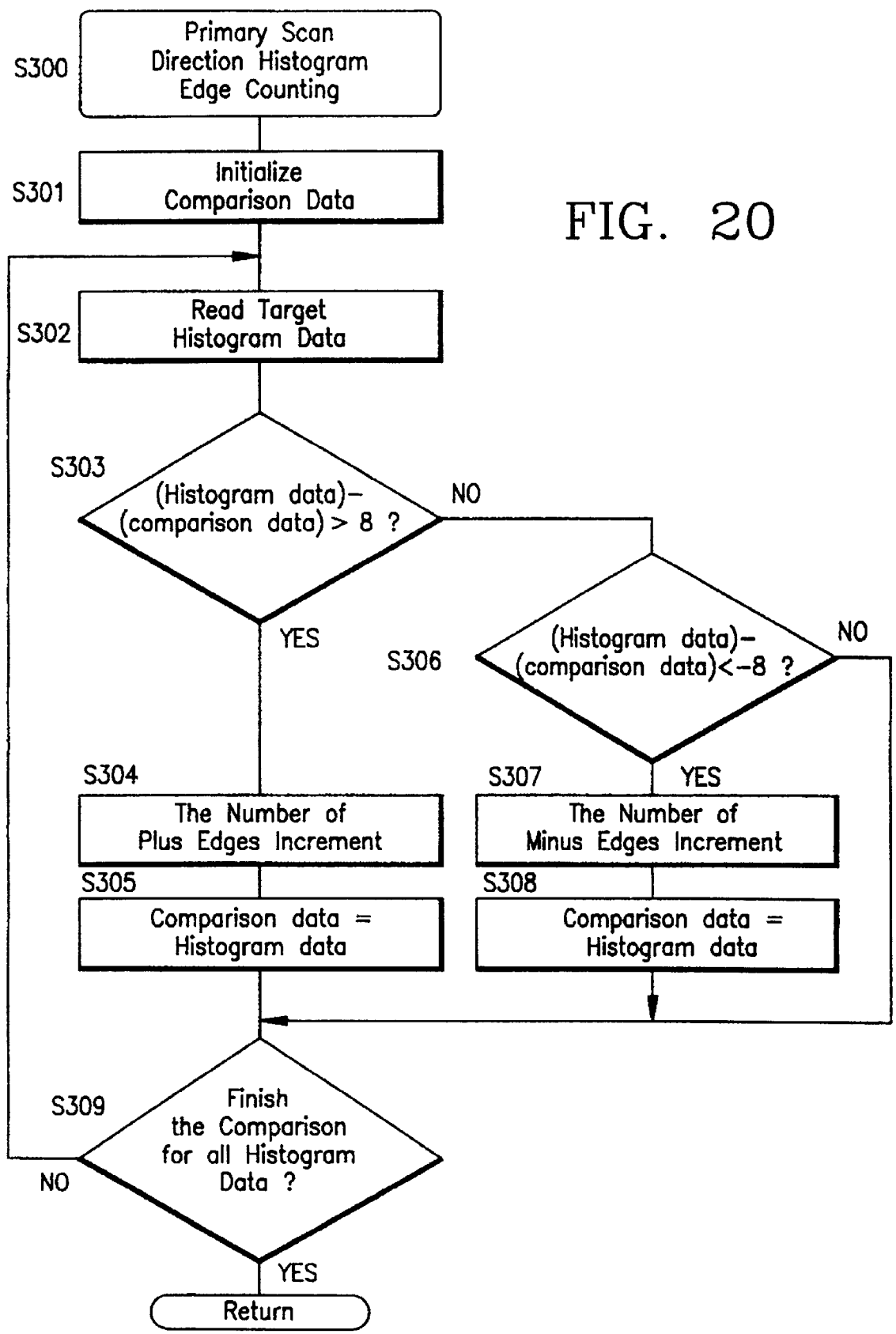
FIG. 20 is a flow chart showing the primary scanning direction edge count sequence.

FIG. 20 is a flow chart showing the primary scanning direction edge counting sequence (step S300 in FIG. 15). Comparison data, which is histogram data determined to be an edge in the previous comparison, is first initialized (step S301). Target histogram data is then read (step S302). Where the difference between the histogram data and the comparison data is +8 or larger (equivalent to one letter of the letter image) (YES in step S303), it is determined that the edge is a plus edge and the number of plus edges is increased by one (step S304). Rewriting of the comparison data is carried out in order to use the current histogram data as comparison data for the next histogram data (step S305).

Where the difference between the histogram data and the comparison data is −8 or smaller (equivalent to one letter of the letter image) (YES in step S306), the edge is determined to be a minus edge and the number of minus edges is increased by one (step S307). Rewriting of the comparison data is carried out in order to use the current histogram data as comparison data for the next histogram data (step S308). Steps S302 through S308 are carried out for all histogram data (step S309). By carrying out said processing as to all histogram data obtained for blocks aligned in the primary scanning direction, the numbers of plus edges and minus edges in the primary scanning direction can be obtained.

(3-6) Secondary Scanning Direction Histogram Calculation Routine

Figure 21:
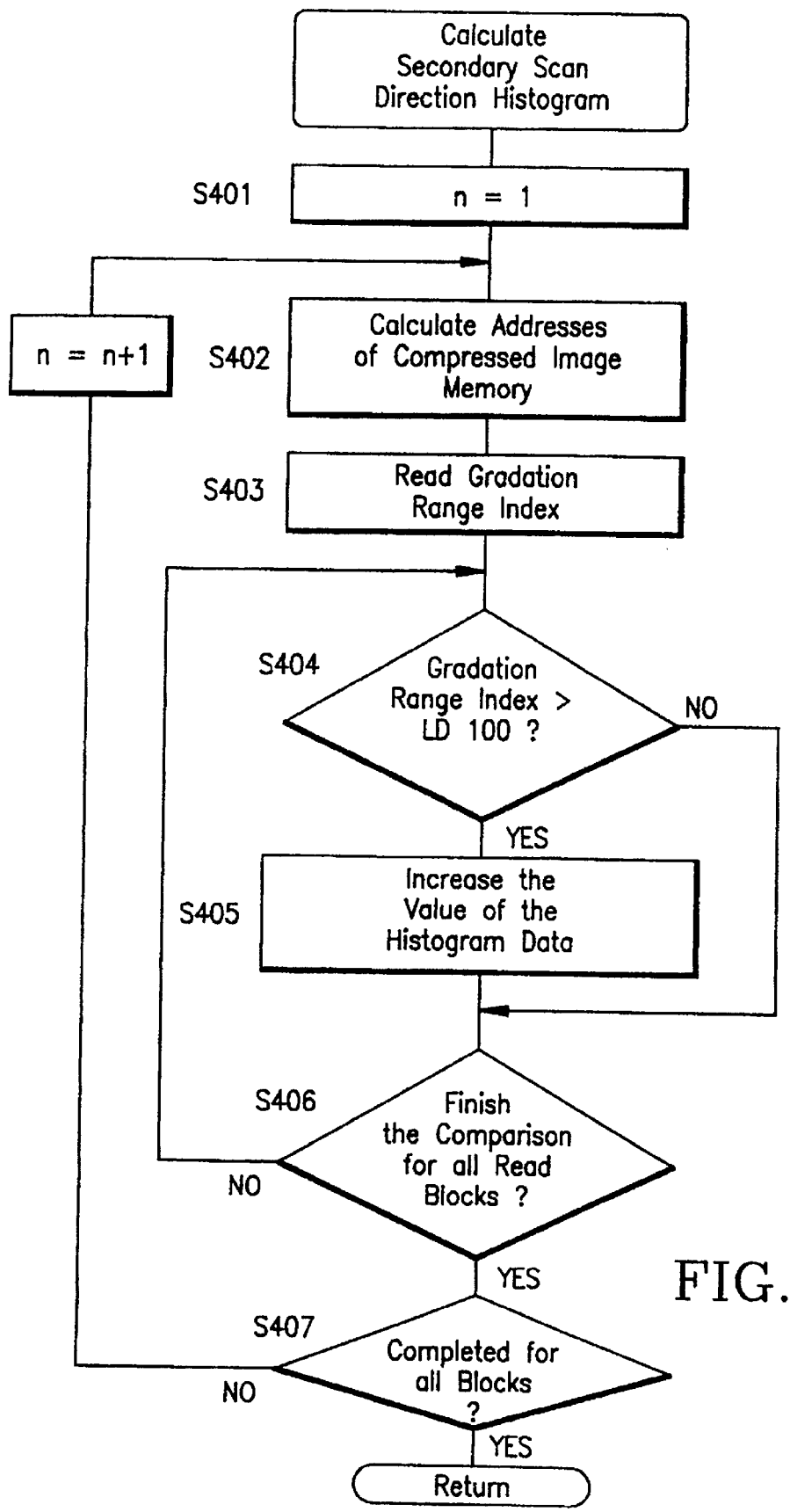
FIG. 21 is a flow chart showing the secondary scanning direction histogram calculation sequence.

FIG. 21 is a flow chart showing the secondary scanning direction histogram calculation sequence (step S400 in FIG. 15). n=1 is set as the initial setting (step S401). Read addresses to read the values of gradation ranges index LD of the nth ($1 \leq n \leq WY$) blocks in the secondary scanning direction, which are aligned vertical to the secondary scanning direction, are calculated via compressed image memory 610 (step S402). Based on the read addresses, the values of gradation range index LD of the nth blocks in the secondary scanning direction, which are aligned vertical to the secondary scanning direction, are read (step S403). Where the value of gradation range index LD of the block thus read is equal to or larger than a prescribed threshold value (100 in this embodiment) (YES in step S404), the value of the histogram data for this nth block is increased by one (step S405). The determination of step S404 is repeated until determination as to all of the nth blocks in the secondary scanning direction is completed (step S406). Through this, histogram data for the nth blocks in the secondary scanning direction is obtained. Where processing regarding all blocks has not been completed (NO in step S407), 1 is added to the value of n (step S408) and the process returns to step S402. When processing is completed for all blocks (YES in step S407), the process returns to the main routine of the orientation identification sequence.

(3-7) Secondary Scanning Direction Histogram Edge Counting Routine

Figure 22:
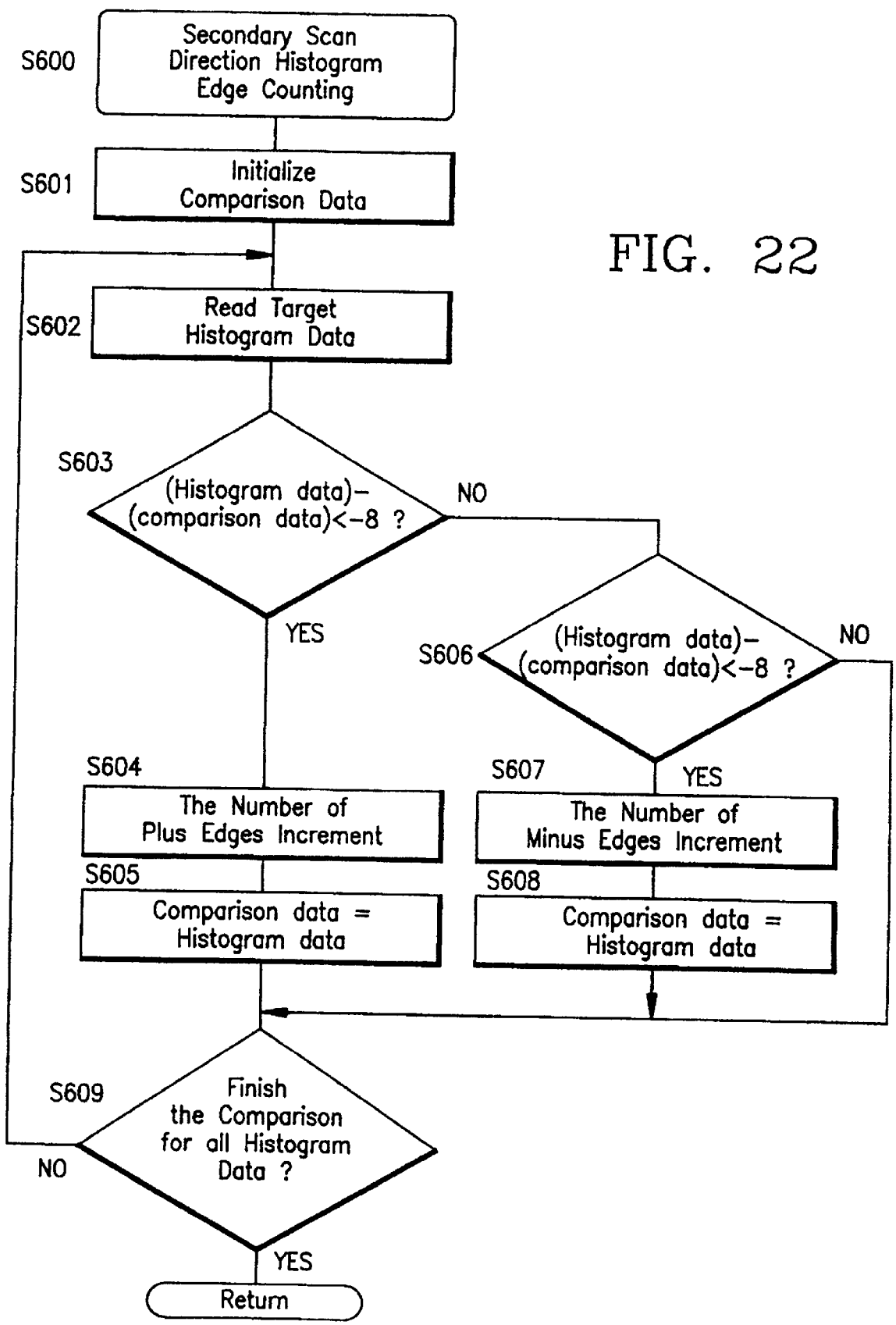
FIG. 22 is a flow chart showing the secondary scanning direction histogram edge count sequence.

FIG. 22 is a flow chart showing the secondary scanning direction histogram edge counting sequence (step S600 in FIG. 15). Comparison data, which is histogram data determined to be an edge in the previous comparison is first initialized (step S601). Target histogram data is read (step S602). Where the difference between the histogram data and the comparison data is +8 or larger (equivalent to one letter of the letter image) (YES in step S603), it is determined that the edge is a plus edge and the number of plus edges is increased by one (step S604). Rewriting of the comparison data is carried out in order to use the current histogram data as comparison data for the next histogram data (step S605).

Where the difference between the histogram data and the comparison data is −8 or smaller (equivalent to one letter of the letter image) (YES in step S606), the edge is determined to be a minus edge and the number of minus edges is increased by one (step S607). Rewriting of the comparison data is carried out in order to use the current histogram data as comparison data for the next histogram data (step S508). Steps S602 through S608 are carried out for all histogram data (step S609). By carrying out said processing as to all histogram data obtained for blocks aligned in the secondary scanning direction, the numbers of plus edges and minus edges in the secondary scanning direction can be obtained.

(3-8) Number of Edges Determination Routine

FIG. 23 is a flow chart showing the sequence to determine the number of edges (step S700 in FIG. 15). First, in order to determine the orientation of the alignment of letters in the document image, the number of edges, in other words, the total of the number of plus edges and the number of minus edges, are compared as to the primary and secondary scanning directions (step S701). In a document in which letters are horizontally aligned, in terms of edges in the direction perpendicular to the direction of alignment of letters, since a letter and a blank area appear alternately, the number of plus edges and the number of minus edges are approximately the same and said numbers are larger than the numbers for the direction parallel to the direction of letter alignment. Consequently, the orientation of letter alignment is determined based on the comparison between the number of edges in the primary scanning direction and the number of edges in the secondary scanning direction. Where the number of edges in the primary scanning direction is smaller than the number of edges in the secondary scanning direction (YES in step S701), the difference between the number of plus edges and the number of minus edges in the primary scanning direction is obtained (step S702). If the difference is 2 or larger (YES in step S703), it can be determined that the line beginnings are located on the side where primary scanning starts.

In this case, the document is placed on platen glass 107 as shown in FIG. 11(d1). Therefore, the image rotation angle is set at 270 degrees such that the orientation of the image formed on the copy paper will be appropriate from the operator's perspective (step S704).

Where the difference between the number of plus edges and the number of minus edges in the primary scanning direction is smaller than −2 (YES in step S705), it can be determined that the line beginnings are located on the side where primary scanning starts. In this case, the document is placed on platen glass 107 as shown in FIG. 11(c1). Therefore, the image rotation angle is set at 90 degrees such that the orientation of the image formed on the copy paper will be appropriate from the operator's perspective (step S706).

Where there is only a slight difference between the number of plus edges and the number of minus edges in the primary scanning direction (NO in steps S703 and S705), it is determined that the document image does not include any letter images, and the image rotation angle is set at 0 degrees (step S707). Where the total of the number of plus edges and the number of minus edges in the primary scanning direction is equal to or larger than the total of the number of plus edges and the number of minus edges in the secondary scanning direction (NO in step S701), the difference between the number of plus edges and the number of minus edges in the secondary scanning direction is obtained (step S708). Where said difference is 2 or larger, or in other words, where the number of plus edges is larger than the number of minus edges by 2 or more (YES in step S709), it can be determined that the line beginnings are located on the side where secondary scanning starts. In this case, the document is placed on platen glass 107 as shown in FIG. 11(a1). Therefore, the image rotation angle is set at 180 degrees such that the orientation of the image formed on the copy paper will be appropriate from the operator's perspective (step S710).

Where the difference between the number of edges is −2 or smaller, in other words, the number of plus edges is smaller than the number of minus edges by 2 or more (YES in step S711), it can be determined that the line beginnings are located on the side where secondary scanning starts. In this case, the document is placed on platen glass 107 as shown in FIG. 11(b1). Namely, the orientation of the image formed on the copy paper will be appropriate from the operator's perspective without rotating the image at all. Therefore, the image rotation angle is set at 0 degrees (step S712).

Where there is little difference between the number of plus edges and the number of minus edges (NO in steps S709 and S711), it is determined that the document image does not include any letter images and the image rotation angle is set at 0 degrees (step S713).

The copy machine of the construction described above does not require any special circuits or complex software-based processing to identify the image orientation. Therefore, there are no burdens or limitations in terms of cost or time. In addition, in comparison with conventional methods, accurate orientation identification can be performed even with document images which have complicated density distributions.

Using said copy machine, the operator can obtain copies in a constant orientation at all times without concern about the direction in which the document is placed on the platen glass. Further, if the orientation of the copy output is constant regardless of the direction of placement of the document, the constructions and control of ejected paper processing mechanisms such as stapling and sorting mechanisms can be simplified.

As explained above, in an image processing device such as that represented by said digital copy machine, the orientation of the image formed on the copy paper by the image forming means is made constant by means of the image rotating means changing the order to read addresses for blocks to be read from the memory unit to the decoding unit and the order of coded data for respective blocks based on the result of identification by the orientation identifying unit. In this way, in comparison with the case where rotation is performed with regard to RGB image data after decoding, the amount of data processed can be reduced greatly. Consequently, the capacity of a memory needed for the orientation identification and image rotation processes, as well as processing time, can be reduced.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A method of image processing, comprising the steps of:
    dividing document image data into a plurality of blocks, each of the blocks comprising a prescribed pixel matrix;
    calculating an average value information and a gradation range index based on the image data contained in each of the blocks;
    converting the data for each pixel of each of the blocks into coded image data based on said average value information and said gradation range index so that the coded image data defines each pixel with fewer gradation levels than the original image data; and
    identifying the orientation of letters in the document image based on the coded image data.

2. The method of claim 1, wherein the document image data is eight bits per pixel capable of representing 256 gradation levels and the coded image data includes two bits per pixel representing four gradation levels.

3. The method of claim 2, wherein the prescribed pixel matrix includes sixteen pixels, and the coded image data is sixteen bytes per block, which includes average value information of eight bits, a gradation range index of eight bits, and thirty two bits representing pixel information.

4. The method of claim 1, further comprising:
    determining which of the blocks belongs to a letter image by comparing the gradation range index for the block to a predetermined value;
    forming histograms of the letter distributions for the letter image portion of the document image; and
    identifying an orientation of the document image by counting plus edges and minus edges of the histograms.

5. A method of processing image data for a document, comprising the steps of:
    forming a letter distribution histogram for a primary scanning direction and a letter distribution histogram for a secondary scanning direction;
    identifying a direction in which letters of the document are aligned based on a number of change points in the histogram for the primary scanning direction and a number of change points in the histogram for the secondary scanning direction; and
    identifying locations of line starts based on the number of change points at which the histogram value increases and the number of change points at which the histogram value decreases, said change points being obtained from the histogram for the scanning direction parallel to the identified orientation.

6. The method of claim 5, wherein the direction identifying step includes:
    comparing a total number of edges rising and falling in the primary scanning direction histogram with a total number of edges rising and falling in the secondary scanning direction histogram; and
    selecting as a direction of alignment of letters the direction having the fewer number of edges rising and falling.

7. A method of processing image data for a document, comprising the steps of:
    reading RGB image data for the document;
    converting the read RGB image data into lightness component data and chromaticity component data;
    dividing the document image data into a plurality of blocks, each of the blocks comprising a prescribed pixel matrix;
    calculating an average value information and a gradation range index for the lightness component data and chromaticity component data for each of the blocks;
    converting the lightness component data and the chromaticity component data for each pixel of each of the blocks into coded image data based on said average value information and said gradation range index so that the coded image data defines each pixel with fewer gradation levels than the original image data;
    storing in a memory unit the lightness component and chromaticity component average value information, gradation range index and coded data, which were obtained for each block through the converting step;
    determining whether or not a particular block of the plurality of blocks belongs to a letter image based on the lightness component gradation range index obtained for the particular block through the converting process;
    forming a letter distribution histogram for a primary scanning direction and a letter distribution histogram for a secondary scanning direction for each block determined to belong to a letter image;
    identifying a direction in which letters of the document are aligned based on a number of change points in the histogram for the primary scanning direction and a number of change points in the histogram for the secondary scanning direction;
    identifying locations of line starts based on the number of change points at which the histogram value increases and the number of change points at which the histogram value decreases, said change points being obtained from the histogram for the scanning direction parallel to the identified orientation;
    decoding the coded data for each of the blocks based on the respective average value information and gradation range index in the memory unit for the block;
    forming an image on copy paper based on the decoded data; and
    changing an order of the read addresses for the blocks to be read to said decoding unit from said memory unit and an order of the coded data for each block to be read based on the result of processing by said orientation identifying unit.

8. The method of claim 7, wherein the RGB image data is eight bits per pixel capable of representing 256 gradation levels and the coded image data includes two bits per pixel representing four gradation levels.

9. The method of claim 8, wherein the prescribed pixel matrix includes sixteen pixels, and the coded image data is sixteen bytes per block, which includes average value information of eight bits, a gradation range index of eight bits, and thirty two bits representing pixel information.

10. The method of claim 7, wherein the direction identifying step includes:

comparing a total number of edges rising and falling in the primary scanning direction histogram with a total number of edges rising and falling in the secondary scanning direction histogram; and selecting as a direction of alignment of letters the direction having the fewer number of edges rising and falling.

11. An image processing device, comprising:

a calculating unit for dividing document image data into a plurality of blocks each of the blocks comprising a prescribed pixel matrix and calculating an average value information and a gradation range index based on the image data contained in each of the blocks;

a coding unit that converts the data for each pixel of each of the blocks into coded image data based on said average value information and said gradation range index so that the coded image data defines each pixel with fewer gradation levels than the original image data; and an identifying means that identifies the orientation of letters in the document image based on the coded image data.

12. The image processing device of claim 11, wherein the document image data is eight bits per pixel capable of representing 256 gradation levels and the coded image data includes two bits per pixel representing four gradation levels.

13. The image processing device of claim 12, wherein the prescribed pixel matrix includes sixteen pixels, and the coded image data is sixteen bytes per block, which includes average value information of eight bits, a gradation range index of eight bits, and thirty two bits representing pixel information.

14. The image processing device of claim 11, further comprising:

means for determining which of the blocks belongs to a letter image by comparing the gradation range index for the block to a predetermined value;

means for forming histograms of the letter distributions for the letter image portion of the document image; and means for identifying the orientation of the document image by counting plus edges and minus edges of the histograms.

15. An image processing device for processing image data for a document, comprising:

histogram forming means for forming a letter distribution histogram for a primary scanning direction and a letter distribution histogram for a secondary scanning direction;

a direction identifying unit for identifying a direction in which letters of the document are aligned based on a number of change points in the histogram for the primary scanning direction and a number of change points in the histogram for the secondary scanning direction; and an orientation identifying unit for identifying locations of line starts based on the number of change points at which the histogram value increases and the number of change points at which the histogram value decreases, said change points being obtained from the histogram for the scanning direction parallel to the identified orientation.

16. The image processing device of claim 15, wherein the direction identifying unit includes:

means for comparing a total number of edges rising and falling in the primary scanning direction histogram with a total number of edges rising and falling in the secondary scanning direction histogram; and means for selecting as a direction of alignment of letters the direction having the fewer number of edges rising and falling.

17. An image processing device for processing image data for a document, comprising:

reading means for reading RGB image data for the document;

a data converting unit for converting the read RGB image data into lightness component data and chromaticity component data;

a coding unit for dividing the document image data into a plurality of blocks, each of the blocks comprising a prescribed pixel matrix, calculating an average value information and a gradation range index for the lightness component data and chromaticity component data for each of the blocks, and converting the lightness component data and the chromaticity component data for each pixel of each of the blocks into coded image data based on said average value information and said gradation range index so that the coded image data defines each pixel with fewer gradation levels than the original image data;

a memory unit for storing the lightness component and chromaticity component average value information, gradation range index and coded data, which were obtained for each block by the coding unit;

means for determining whether or not a particular block of the plurality of blocks belongs to a letter image based on the lightness component gradation range index obtained for the particular block by the coding unit;

histogram forming means for forming a letter distribution histogram for a primary scanning direction and a letter distribution histogram for a secondary scanning direction for the blocks determined to belong to a letter image;

an orientation identification unit for identifying a direction in which letters of the document are aligned based on a number of change points in the histogram for the primary scanning direction and a number of change points in the histogram for the secondary scanning direction, and for identifying locations of line starts based on the number of change points at which the histogram value increases and the number of change points at which the histogram value decreases, said change points being obtained from the histogram for the scanning direction parallel to the identified orientation;

a decoding unit for decoding the coded data for one of the blocks based on the average value information and gradation range index in the memory unit for the one block;

image forming means for forming an image on copy paper based on the decoded data; and an image rotating unit that changes an order of the read addresses for the blocks to be read to said decoding unit from said memory unit and an order of the coded data for each block to be read based on the result of processing by said orientation identifying unit.

18. The image processing device of claim 17, wherein the RGB image data is eight bits per pixel capable of representing 256 gradation levels and the coded image data includes two bits per pixel representing four gradation levels.

19. The image processing device of claim 18, wherein the prescribed pixel matrix includes sixteen pixels, and the coded image data is sixteen bytes per block, which includes average value information of eight bits, a gradation range index of eight bits, and thirty two bits representing pixel information.

20. The image processing device of claim 17, wherein the direction identifying unit includes:

means for comparing a total number of edges rising and falling in the primary scanning direction histogram with a total number of edges rising and falling in the secondary scanning direction histogram; and means for selecting as a direction of alignment of letters the direction having the fewer number of edges rising and falling.

\* \* \* \* \*